US012518696B2

(12) United States Patent
Xie

(10) Patent No.: US 12,518,696 B2
(45) **Date of Patent: *Jan. 6, 2026**

(54) DISPLAY PANEL AND DISPLAY DEVICE

(71) Applicant: Xiamen Tianma Display Technology Co., Ltd., Xiamen (CN)

(72) Inventor: Jianfeng Xie, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/741,410

(22) Filed: Jun. 12, 2024

(65) Prior Publication Data

US 2024/0331639 A1 Oct. 3, 2024

Related U.S. Application Data

(63) Continuation of application No. 18/078,200, filed on Dec. 9, 2022, now Pat. No. 12,205,543.

(30) Foreign Application Priority Data

Aug. 24, 2022 (CN) ........................ 202211021959.4

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2310/0251* (2013.01); *G09G 2310/08* (2013.01); *G09G 2320/0233* (2013.01); *G09G 2320/0686* (2013.01); *G09G 2330/021* (2013.01)

(58) Field of Classification Search
None
See application file for complete search history.

(56) References Cited

U.S. PATENT DOCUMENTS

2021/0110771 A1* 4/2021 Lee ...................... G09G 3/3258
2023/0137517 A1* 5/2023 Fu ............................ G09G 3/20
345/214

FOREIGN PATENT DOCUMENTS

CN 114842805 A * 8/2022 ............... G09G 3/32

OTHER PUBLICATIONS

CN114842805 machine translation (Year: 2022).*

* cited by examiner

*Primary Examiner* — Dorothy Harris
(74) *Attorney, Agent, or Firm* — KDW Firm PLLC

(57) ABSTRACT

Provided are a display panel and a display device. The display panel includes at least two display regions and a pixel circuit. The at least two display regions include a first display region and a second display region. The pixel circuit includes at least a first pixel circuit and a second pixel circuit, where the first pixel circuit is disposed in the first display region and the second pixel circuit is disposed in the second display region. The pixel circuit receives a bias adjustment signal including a first bias adjustment signal and a second bias adjustment signal, where when a refresh rate of the first display region is f1, the first pixel circuit receives the first bias adjustment signal, and when a refresh rate of the second display region is f2, the second pixel circuit receives the second bias adjustment signal.

18 Claims, 16 Drawing Sheets

DISPLAY PANEL AND DISPLAY DEVICE

CROSS-REFERENCE TO RELATED APPLICATION(S)

This is a continuation of U.S. patent application Ser. No. 18/078,200, filed Dec. 9, 2022, which claims priority to Chinese Patent Application No. 202211021959.4 filed Aug. 24, 2022, the disclosures of which are incorporated herein by reference in their entireties.

TECHNICAL FIELD

Embodiments of the present disclosure relate to display technology and, in particular, to a display panel and a display device.

BACKGROUND

With the development of display technology, new types of display panels such as organic light-emitting diode (OLED) display panels and micro light-emitting diode (microLED) display panels appear one after another and become widely popular with consumers.

An electronic product performs displays with different refresh rates in different application scenarios. For example, a dynamic image is displayed through a drive in a drive mode with a relatively high refresh rate (for example, a sports event or a game scenario) to ensure the smoothness of the display image; and a slow-motion image or a static image is displayed through a drive in a drive mode with a relatively low refresh rate to reduce power consumption.

In some special application scenarios, there is also a dynamic partition refresh display technology for a display screen with which the display screen can be divided into several regions and the refresh rate of each region can be independently set. With this technology, the power consumption for driving the display screen can be reduced. However, when the preceding partition refresh rate control is implemented, the problem of display non-uniformity may occur in a current display panel, which affects a display effect.

SUMMARY

Embodiments of the present disclosure provide a display panel and a display device to reduce the problem of display non-uniformity during a display process in which partition refresh rates are different, thereby improving a display effect.

In a first aspect, embodiments of the present disclosure provide a display panel. The display panel includes at least two display regions and a pixel circuit.

The at least two display regions include a first display region and a second display region.

The pixel circuit includes at least a first pixel circuit and a second pixel circuit, where the first pixel circuit is disposed in the first display region and the second pixel circuit is disposed in the second display region.

The pixel circuit receives a bias adjustment signal including a first bias adjustment signal and a second bias adjustment signal, when a refresh rate of the first display region is f1, the first pixel circuit receives the first bias adjustment signal, and when a refresh rate of the second display region is f2, f1≠f2, and the second pixel circuit receives the second bias adjustment signal.

The display panel further includes a first signal bus, where the first signal bus is electrically connected to the first pixel circuit and the second pixel circuit respectively, the first signal bus is configured to provide the first bias adjustment signal to the first pixel circuit in a first period, and to provide the second bias adjustment signal to the second pixel circuit in a second period.

In a second aspect, embodiments of the present disclosure provide a display panel. The display panel includes at least two display regions and a pixel circuit.

The at least two display regions include a first display region and a second display region.

The pixel circuit includes at least a first pixel circuit and a second pixel circuit, where the first pixel circuit is disposed in the first display region and the second pixel circuit is disposed in the second display region.

The pixel circuit receives a bias adjustment signal including a first bias adjustment signal and a second bias adjustment signal, when a refresh rate of the first display region is f1, the first pixel circuit receives the first bias adjustment signal, and when a refresh rate of the second display region is f2, f1≠f2, and the second pixel circuit receives the second bias adjustment signal, The display panel further includes a second signal bus and a third signal bus, where the second signal bus is electrically connected to the first pixel circuit, the third signal bus is electrically connected to the second pixel circuit, the second signal bus is configured to provide the first bias adjustment signal to the first pixel circuit, and the third signal bus is configured to provide the second bias adjustment signal to the second pixel circuit.

In a third aspect, embodiments of the present disclosure further provide a display device that includes the preceding display panel.

DETAILED DESCRIPTION

Figure 1:
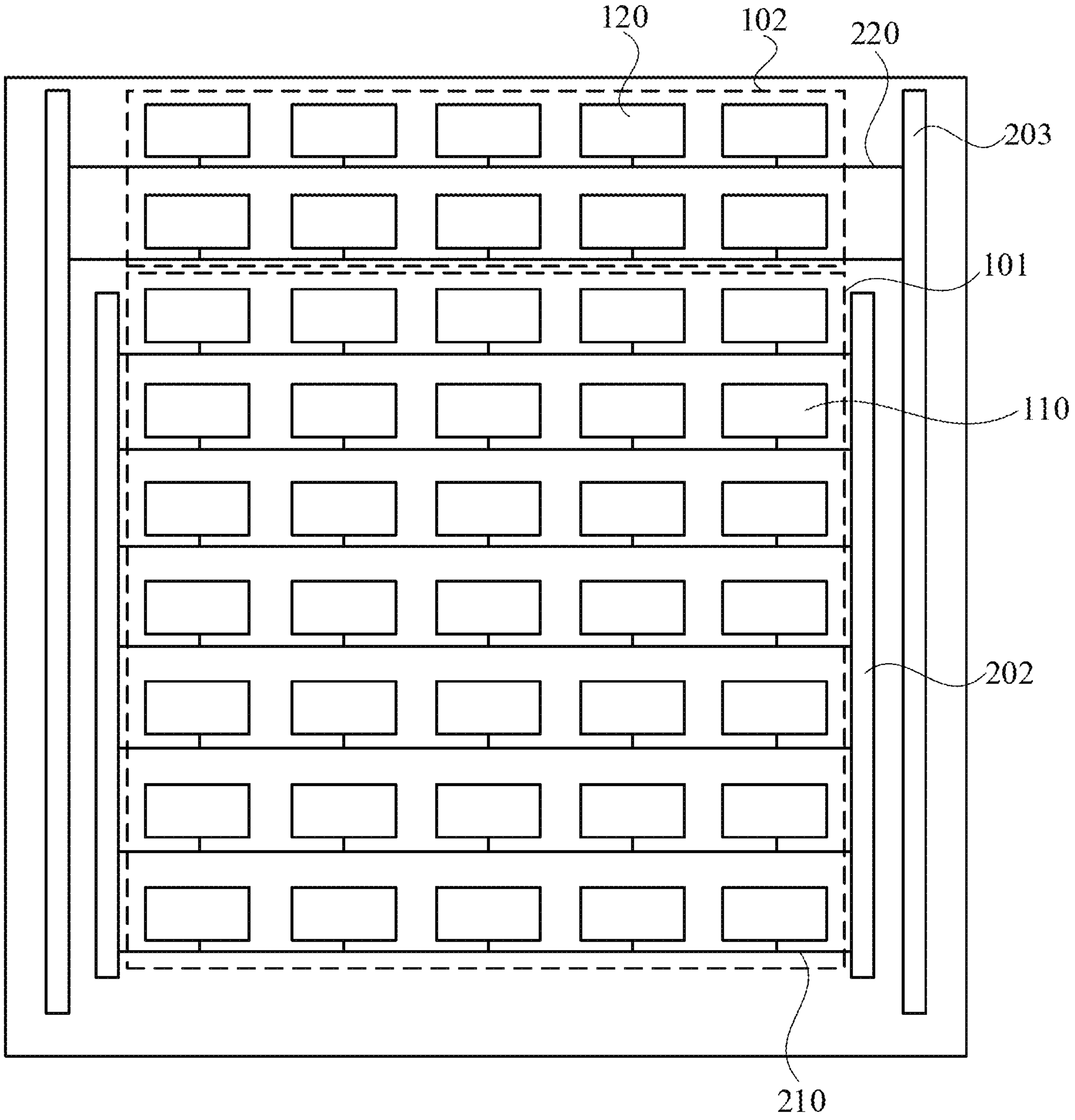
FIG. 1 is a structure diagram of a display panel according to an embodiment of the present disclosure.

Hereinafter the present disclosure is further described in detail in conjunction with the drawings and embodiments. It is to be understood that the embodiments described herein are only intended to illustrate but not to limit the present disclosure. Additionally, it is to be noted that, for ease of description, only part, not all, of structures related to the present disclosure are illustrated in the drawings.

Terms used in the embodiments of the present disclosure are intended only to describe the embodiments and not to limit the present disclosure. It is to be noted that nouns of locality such as "on", "below", "left", and "right" in the embodiments of the present disclosure are described from angles shown in the drawings and are not to be construed as limiting the embodiments of the present disclosure. Additionally, in the context, it is to be understood that when an element is formed "on" or "below" another element, the element can not only be directly formed "on" or "below" the other element but also be indirectly formed "on" or "below" the other element via an intermediate element. Terms such as "first" and "second" are used only for the purpose of description to distinguish between different components and not to indicate any order, quantity, or importance. For those of ordinary skill in the art, specific meanings of the preceding terms in the present disclosure may be understood according to specific situations.

With the development of displays, the resolution of a display panel is increasingly high, resulting in relatively large power consumption of the display panel. To reduce the power consumption of the display panel, a dynamic partition refresh display technology with which regions have different refresh rates is proposed in the related art. However, during a dynamic display, different regions have different refresh rates, and driving processes of different display regions are not optimized in the related art, which reduces a display effect or causes a low-quality display.

To solve the preceding problem, the embodiments of the present disclosure provide a display panel that includes at least two display regions and a pixel circuit. The at least two display regions include a first display region and a second display region. The pixel circuit includes at least a first pixel circuit and a second pixel circuit, the first pixel circuit is disposed in the first display region and the second pixel circuit is disposed in the second display region. The pixel circuit receives a bias adjustment signal including a first bias adjustment signal and a second bias adjustment signal, where when a refresh rate of the first display region is f1, the first pixel circuit receives the first bias adjustment signal, and when a refresh rate of the second display region is f2, the second pixel circuit receives the second bias adjustment signal, where f1≠f2, and the first bias adjustment signal is different from the second bias adjustment signal.

The display panel provided by this embodiment may be an OLED display panel, a microLED display panel, or another type of display panel. The display panel may be provided with different quantities of display regions according to an actual display image, for example, two display regions, three display regions, four display regions, or more display regions. Different display regions may have different refresh rates or the same refresh rate. Specifically, for a slow-motion image or a static image, a relatively low refresh rate may be adopted, so as to reduce power consumption. For a sports event or a game scenario, a relatively high refresh rate needs to be adopted, so as to avoid a flicker and improve the display effect. For some application scenarios, some display regions (for example, central display regions) need to have high refresh rates while other display regions (for example, edge display regions on two sides) have low refresh rates. The design may be made according to an actual situation in a specific implementation. Displays with different refresh rates may be implemented in the first display region and the second display region. For example, the refresh rate of the first display region may be 30 Hz, and the refresh rate of the second display region may be 60 Hz. For a display panel for which a high refresh rate may be achieved, a refresh rate of some display region may be configured to be 90 Hz, 120 Hz, or the like.

For example, the display panel includes two display regions. FIG. 1 is a structure diagram of a display panel according to an embodiment of the present disclosure. Referring to FIG. 1, the display panel includes a first display region 101, a second display region 102, and a pixel circuit. The pixel circuit includes a first pixel circuit 110 and a second pixel circuit 120, where the first pixel circuit 110 is disposed in the first display region 101 and configured to provide a drive current for a light-emitting element (not shown in FIG. 1) in the first display region 101 and the second pixel circuit 120 is disposed in the second display region 102 and configured to provide a drive current for a light-emitting element (not shown in FIG. 1) in the second display region 102. The pixel circuit receives a bias adjustment signal including a first bias adjustment signal and a second bias adjustment signal, when a refresh rate of the first display region 101 is f1, the first pixel circuit 110 receives the first bias adjustment signal, and when a refresh rate of the second display region 102 is f2, the second pixel circuit 120 receives the second bias adjustment signal, where f1≠f2, and the first bias adjustment signal is different from the second bias adjustment signal. Since the bias adjustment signal is a signal received by the pixel circuit to adjust a bias state of a drive transistor, the magnitude of the bias adjustment signal affects an adjustment process of the bias state of the drive transistor. When the different display regions have the different refresh rates, a frame of display image has different durations and the light-emitting elements have different light emission durations. The drive current for the light-emitting element to emit light is provided by a turned-on drive transistor. Therefore, when the light-emitting elements in the different display regions have the different light emission durations, drive transistors of the pixel circuits in the different display regions have different working states, resulting in different bias states of the drive transistors. Thus, the different bias adjustment signals are required to respectively adjust the bias states of the drive transistors in the pixel circuits corresponding to the first display region 101 and the second display region 102, which is conducive to optimizing the display effect.

It is to be noted that in a specific implementation, the first bias adjustment signal and the second bias adjustment signal may be provided by the same bus in a time-division manner or may be respectively provided by corresponding buses independently. For example, as shown in FIG. 1, the first bias adjustment signal may be provided by a first bias adjustment signal line 210, the second bias adjustment signal may be provided by a second bias adjustment signal line 220, a second signal bus 202 is configured to provide a signal for the first bias adjustment signal line 210, and a third signal bus 203 is configured to provide a signal for the second bias adjustment signal line 220 such that the first bias adjustment signal and the second adjustment signal may be provided at the same time without being affected. For example, when two adjacent rows of pixel circuits are respectively disposed in two display regions with different refresh rates, corresponding bias adjustment signal lines are configured to provide bias adjustment signals respectively, and the second bias adjustment signal may be synchronously provided for the next row of pixel circuits while the first bias adjustment signal is provided for a previous row of pixel circuits, thereby improving the display effect. The design may be made according to the actual situation in the specific implementation.

According to the technical solution of the embodiment of the present disclosure, the bias state of the drive transistor in the pixel circuit is adjusted through the bias adjustment signal. The magnitude of the bias adjustment signal affects the adjustment process of the bias state of the drive transistor. When the refresh rates of the first display region and the second display region are different in order to implement different display functions, the bias states of the drive transistors are different due to different requirements for the pixel circuits. Thus, the different bias adjustment signals are required to respectively adjust the bias states of the drive transistors in the pixel circuits corresponding to the first display region and the second display region, which is conducive to avoiding the display non-uniformity in the different display regions and improving the display effect.

Figure 2:
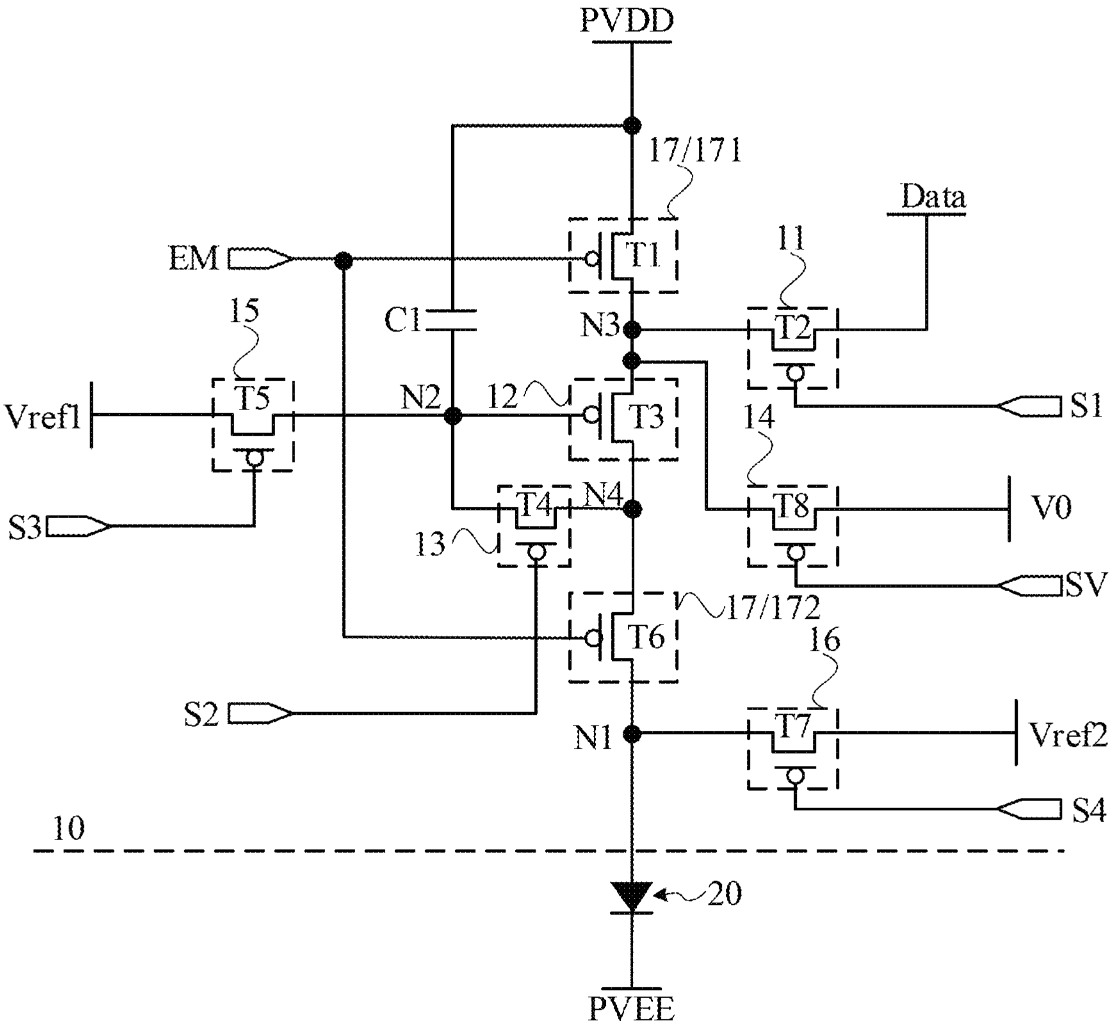
FIG. 2 is a structure diagram of a pixel circuit according to an embodiment of the present disclosure.
Figure 3:
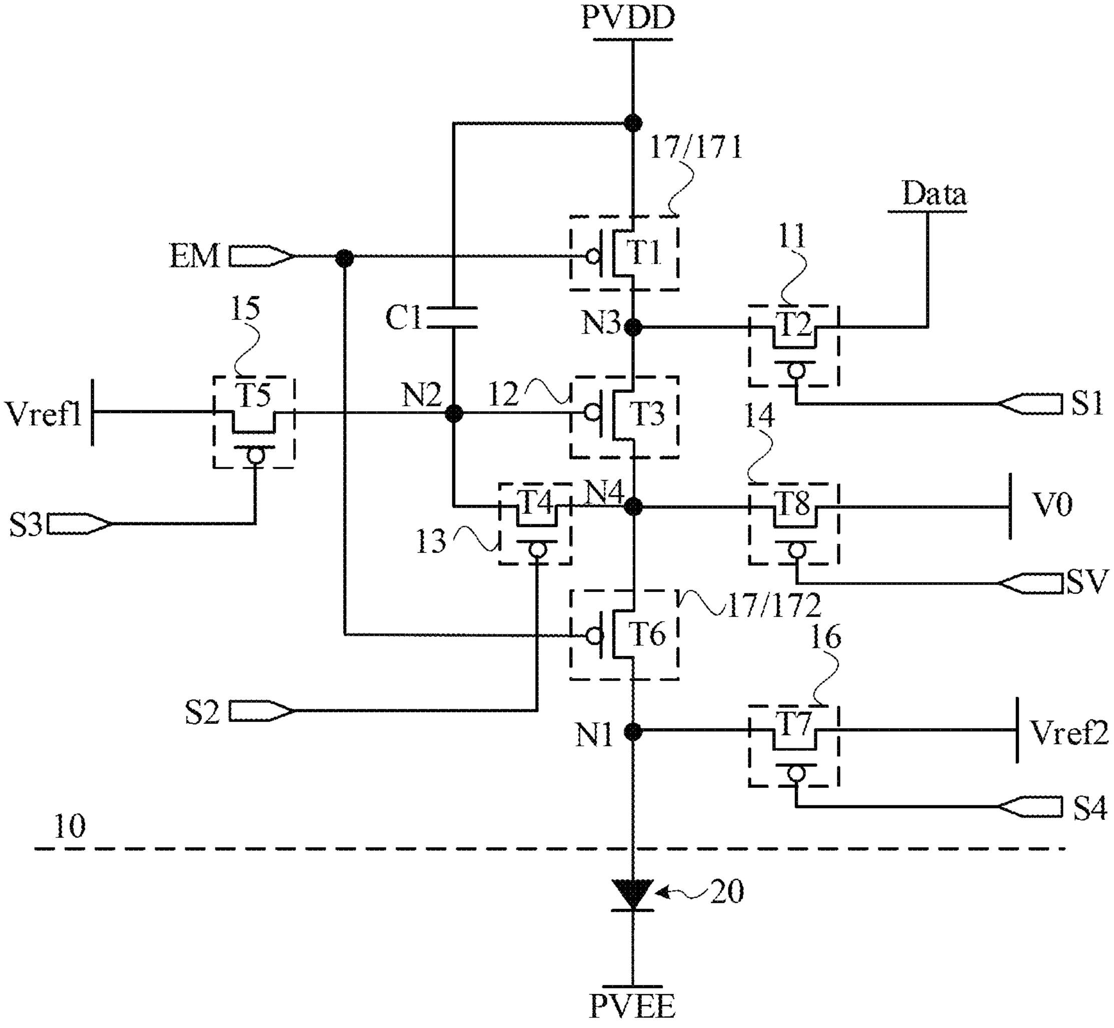
FIG. 3 is a structure diagram of another pixel circuit according to an embodiment of the present disclosure.

FIG. 2 is a structure diagram of a pixel circuit according to an embodiment of the present disclosure, and FIG. 3 is a structure diagram of another pixel circuit according to an embodiment of the present disclosure. Referring to FIG. 2 or FIG. 3, optionally, the pixel circuit 10 includes a data write module 11, a drive module 12, a compensation module 13, and a bias adjustment module 14; the drive module 11 includes a drive transistor T3 for providing a drive current to a light-emitting element 20 of the display panel; the data write module 11 is connected to a first electrode (N3) of the drive transistor T3 and configured to provide a data signal Data for the drive transistor T3; the bias adjustment module 14 is connected to the first electrode (N3, referring to FIG. 2) the drive transistor T3 or a second electrode (N4, referring to FIG. 3) of the drive transistor T3 and configured to provide a bias adjustment signal V0 for the drive transistor T3; and the compensation module 13 is connected between a gate (N2) of the drive transistor T3 and the second electrode (N4) of the drive transistor T3 and configured to compensate a threshold voltage of the drive transistor T3.

In addition, the pixel circuit 10 may further include an initialization module 15, a reset module 16, and a light emission control module 17. The initialization module 15 is configured to provide an initialization signal Vref1 for the gate of the drive transistor T3. The reset module 16 is configured to provide a reset signal Vref2 for the light-emitting element 20. The light emission control module 17 is configured to selectively allow the light-emitting element 20 to enter a light emission stage. Optionally, the light emission control module 17 includes a first light emission control module 171 and a second light emission module 172, where the first light emission control module 171 is connected between a first power signal terminal PVDD and an electrode of the drive transistor T3, and the second light emission control module 172 is connected between another electrode of the drive transistor T3 and the light-emitting element 20.

Optionally, in this embodiment, a control terminal of the data write module 11 receives a first scan signal S1 that controls the data write module 11 to be turned on and off, a control terminal of the compensation module 13 receives a second scan signal S2 that controls the compensation module 13 to be turned on and off; a control terminal of the bias adjustment module 14 receives a bias adjustment control signal SV that controls the bias adjustment module 14 to be turned on and off; a control terminal of the initialization module 15 receives a third scan signal S3 that controls the initialization module 15 to be turned on and off; a control terminal of the reset module 16 receives a fourth scan signal S4 that controls the reset module 16 to be turned on and off, and a control terminal of the light emission control module 17 receives a light emission control signal EM that controls the light emission control module 17 to be turned on and off.

In addition, optionally, in this embodiment, the data write module 11 includes a data write transistor T2, and the first scan signal S1 controls the data write transistor T2 to be turned on and off; the compensation module 13 includes a compensation transistor T4, and the second scan signal S2 controls the compensation transistor T4 to be turned on and off; the bias adjustment module 14 includes a bias adjustment transistor T8, and the bias adjustment control signal SV controls the bias adjustment transistor T8 to be turned on and off; the initialization module 15 includes an initialization transistor T5, and the third scan signal S3 controls the initialization transistor T5 to be turned on and off; the reset module 16 includes a reset transistor T7, and the fourth scan signal S4 controls the reset transistor T7 to be turned on and off; and the first light emission control module 171 includes a first light emission control transistor T1, the second light emission control module 172 includes a second light emission control transistor T6, and the light emission control signal EM controls the first light emission control transistor T1 and the second light emission control transistor T6 to be turned on and off.

It is to be noted that when conditions permit, at least two of the first scan signal S1, the second scan signal S2, the third scan signal S3, the fourth scan signal S4, the bias adjustment control signal SV, the light emission control signal EM, and the like may be the same signal. For example, when the bias adjustment transistor T8 and the reset transistor T7 are of the same type, the bias adjustment control signal SV and the fourth scan signal S4 may be the same signal.

It is to be noted that all transistors in FIG. 2 and FIG. 3 are P-channel metal oxide semiconductor (PMOS) transistors. The pixel circuit 10 further includes a storage capacitor C1, where a first electrode of the storage capacitor C1 is connected to the first power signal terminal PVDD, a second electrode of the storage capacitor C1 is connected to the gate of the drive transistor T3, and the storage capacitor C1 is configured to store signals transmitted to the gate of the drive transistor T2. In other embodiments, all the transistors may be the PMOS transistors or may include both PMOS transistors and N-channel metal oxide semiconductor (NMOS) transistors (for example, the compensation transistor T4 and the initialization transistor T5 are NMOS transistors, and the others are PMOS transistors). All the transistors in the pixel circuit shown in this embodiment are the PMOS transistors, which is only exemplary. The design may be made according to the actual situation in the specific implementation, and a specific structure of the pixel circuit is not limited in the embodiment of the present disclosure.

In the preceding manner, the bias adjustment module 14 is disposed in the pixel circuit 10 and configured to provide the bias adjustment signal to the drive transistor T3. Since a potential difference exists between the gate of the drive transistor T3 and the first electrode of the drive transistor T3 or the second electrode of the drive transistor T3 during a light emission process, a bias problem may be caused. That is, when the drive transistor T3 that is a PMOS transistor is turned on but a voltage of the gate of the drive transistor T3 is higher than a voltage of the first electrode or a voltage of the second electrode, the bias problem occurs; and when the drive transistor T3 that is an NMOS transistor is turned on but a voltage of the gate of the drive transistor T3 is lower than a voltage of the first electrode or a voltage of the second electrode, the bias problem occurs. The bias problem tends to cause a reverse electric field to be generated inside the drive transistor T3, which results in carrier polarization. Thus, a threshold voltage drift of the drive transistor T3 is caused, which causes the drive current generated by the drive transistor T3 to be unstable. Particularly, when displays are performed in the different display regions with the different refresh rates, the drive transistor T3 has the different working states, and the problem of the display non-uniformity occurs. In this embodiment, the different bias adjustment signals are provided for first electrodes of drive transistors T3 or second electrodes of the drive transistors T3 in the different display regions, a voltage difference between the gate of the drive transistor T3 and the first electrode or the second electrode is adjusted in time so that the bias is canceled out and the threshold voltage drift of the drive transistor T3 is avoided, which is conducive to reducing the display non-uniformity.

Figure 4:
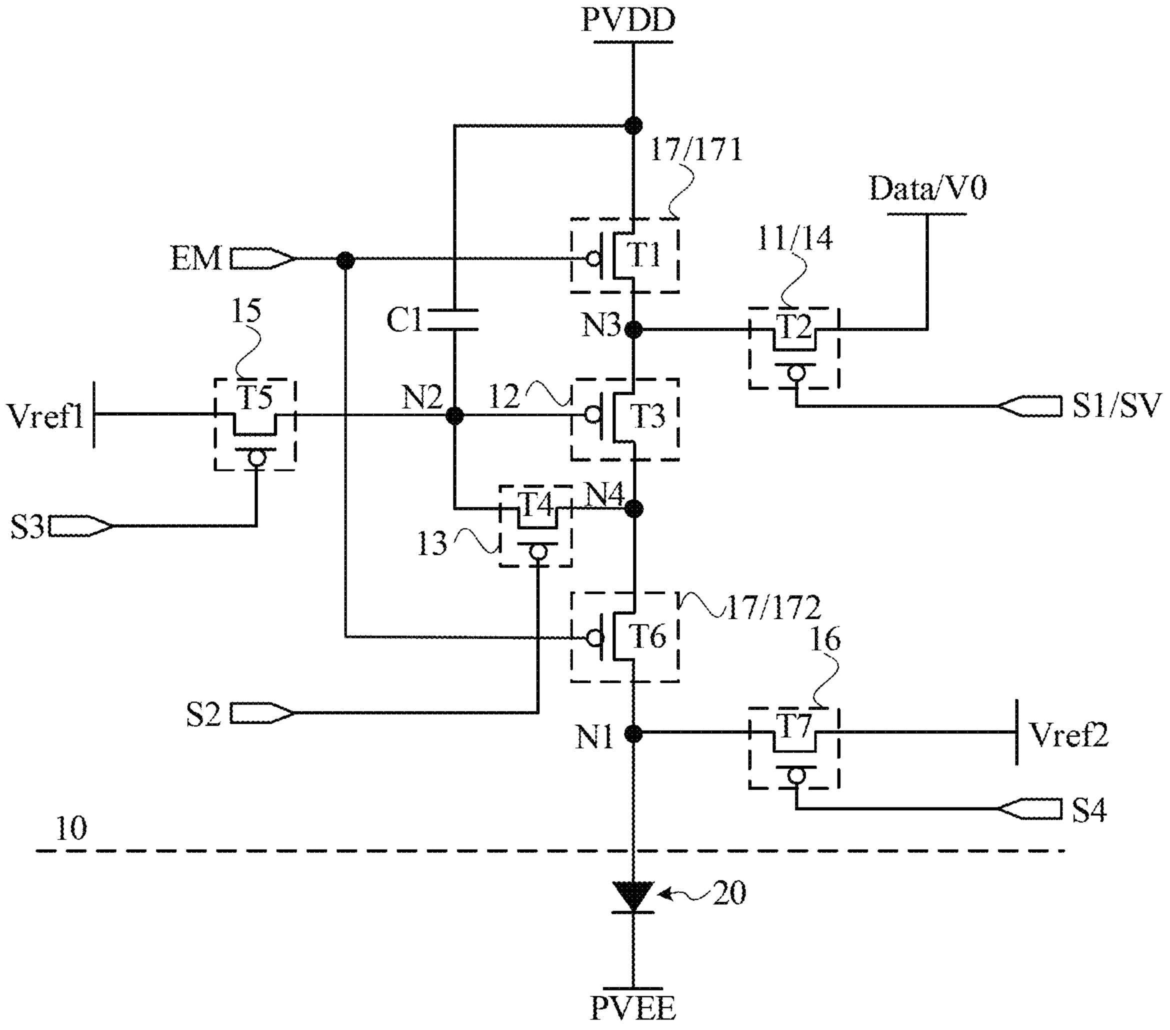
FIG. 4 is a structure diagram of another pixel circuit according to an embodiment of the present disclosure.

FIG. 4 is a structure diagram of another pixel circuit according to an embodiment of the present disclosure. Referring to FIG. 4, optionally, the bias adjustment module 14 is connected to the first electrode of the drive transistor T3, and the data write module 11 is also used as the bias adjustment module 14.

It is to be understood that a working process of the display panel generally includes a refresh frame and a retention frame, where the refresh frame includes a data write stage in which the data signal Data is written into the gate of the drive transistor T3 and used for controlling the brightness of the light-emitting element 20, and the drive transistor T3 controls the light-emitting element 20 to continuously emit light in the retention frame. In a certain embodiment, the bias adjustment module 14 may be controlled to load the bias adjustment signal in the period of the retention frame, and the retention frame does not include the data write stage. Therefore, the data write module 11 may be also used as the bias adjustment module 14, thereby simplifying a circuit structure and reducing the design difficulty of the display panel.

With continued reference to FIG. 2 or FIG. 3, optionally, the pixel circuit 10 further includes the initialization module 15 connected to the gate of the drive transistor T3 and configured to provide the initialization signal Vref1 for the gate of the drive transistor T3. When the display panel switches images, the gate of the drive transistor T3 is initialized by the initialization module 15 so that the influence of a previous frame of display image on the drive transistor T3 can be avoided.

Figure 5:
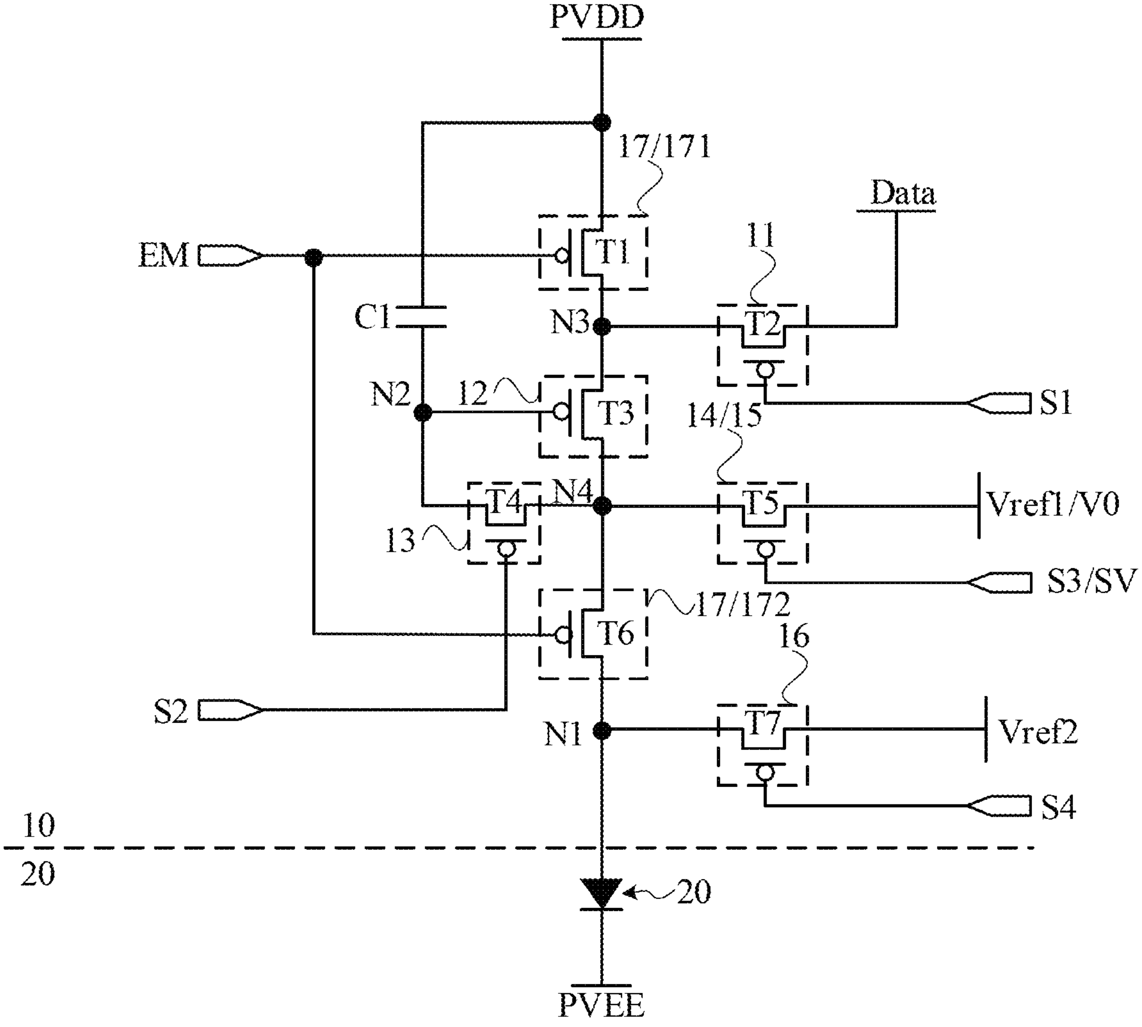
FIG. 5 is a structure diagram of another pixel circuit according to an embodiment of the present disclosure.

FIG. 5 is a structure diagram of another pixel circuit according to an embodiment of the present disclosure. Referring to FIG. 5, optionally, the pixel circuit 10 further includes the initialization module 15 connected to the second electrode of the drive transistor T3 and also used as the bias adjustment module 14.

It is to be understood that in another embodiment, the initialization module 15 may be configured to be connected to the second electrode of the drive transistor T3. In this case, the initialization transistor T5 and the compensation transistor T4 are controlled to be simultaneously turned on in an initialization stage, and after passing through the initialization transistor T5 and the compensation transistor T4, the initialization signal Vref1 is provided for the gate of the drive transistor T3. Since the initialization stage is also in the refresh frame, a stage in which the bias adjustment signal is provided may be in the retention frame. Therefore, as shown in FIG. 5, the initialization module 15 may be configured to be also used as the bias adjustment module 14.

According to the technical solution of the embodiment of the present disclosure, the different bias adjustment signals are designed such that bias adjustments of the drive transistors in the different pixel circuits are implemented, so as to improve the display effect. In the specific implementation, the different bias adjustment signals may be configured to have different voltage values in a certain embodiment. In another embodiment, since each frame of display image has different durations when the displays are performed with the different refresh rates, the number of times the bias adjustment signal is loaded may also be configured to be different. Optionally, a frame of display image includes a refresh frame and a retention frame; in the first display region, the number of times the first bias adjustment signal is loaded in the same refresh frame or in the same retention frame is n1, and a voltage value of the first bias adjustment signal is V1; and in the second display region, the number of times the second bias adjustment signal is loaded in the same refresh frame or in the same retention frame is n2, and a voltage value of the second bias adjustment signal is V2; where n1=n2, and V1≠V2.

The refresh frame is used for refreshing display images such that a signal of a gray value to be displayed is written into the pixel circuit, and the retention frame is used for retaining the display images. Specifically, a higher refresh rate indicates more refresh times. For example, the refresh rate is 60 Hz, which indicates that 60 images may be displayed within 1 second. In the specific implementation, the refresh frame and the retention frame may be configured to be determined time, and the refresh frame and the retention frame may have the same duration or different durations. The refresh frame and the retention frame that have the same duration are used as an example. For example, when the refresh rate is 60 Hz, a frame of display image may be configured to include one refresh frame and one retention frame, and when the refresh rate becomes 30 Hz, a frame of display image may be configured to include one refresh frame and three retention frames. Since the number of refresh frames decreases, the refresh rate decreases. In this embodiment, the bias adjustment signal may be loaded in a refresh frame stage or a retention frame stage. The selection may be made according to the actual situation in the specific implementation.

It is to be understood that when the refresh rate f1 of the first display region is different from the refresh rate f2 of the second display region, the drive transistor in the first pixel circuit and the drive transistor in the second pixel circuit have the different working states. In this embodiment, the number of times the first bias adjustment signal is loaded in the same refresh frame or in the same retention frame may be configured to be the same as the number of times the second bias adjustment signal is loaded in the same refresh frame or in the same retention frame, and the voltage value of the first bias adjustment signal may be configured to be different from the voltage value of the second bias adjustment signal, that is, n1=n2, and V1≠V2, which is conducive to effectively improving the uniformity of the first display region and the second display region and improving the display effect.

In the specific implementation, optionally, f1>f2, and V1<V2; or f1<f2, and V1>V2. It is to be understood that when the refresh rate is relatively low, a frame of display image is retained for a relatively long time. The applicant has found that in order to retain a stable state of the drive transistor, a relatively high bias voltage is adopted, which is conducive to compensating for a characteristic drift caused by the fact that the drive transistor remains in the same working state for a long time, thereby improving the driving performance of the drive transistor. That is, when f1>f2, V1<V2; or when f1<f2, V1>V2. For example, when f1=30 Hz, f2=60 Hz, and f1<f2, the voltage value of the first bias adjustment signal is configured to be greater than the voltage value of the second bias adjustment signal. When f1=60 Hz, f2=30 Hz, and f1>f2, the voltage value of the first bias adjustment signal is configured to be less than the voltage value of the second bias adjustment signal. In the specific implementation, a specific voltage value of the bias adjustment signal may be designed according to the actual situations such as the size of the display region, the refresh rate of the display region, and the brightness of the light-emitting element, which is not limited in the embodiment of the present disclosure.

Figure 6:
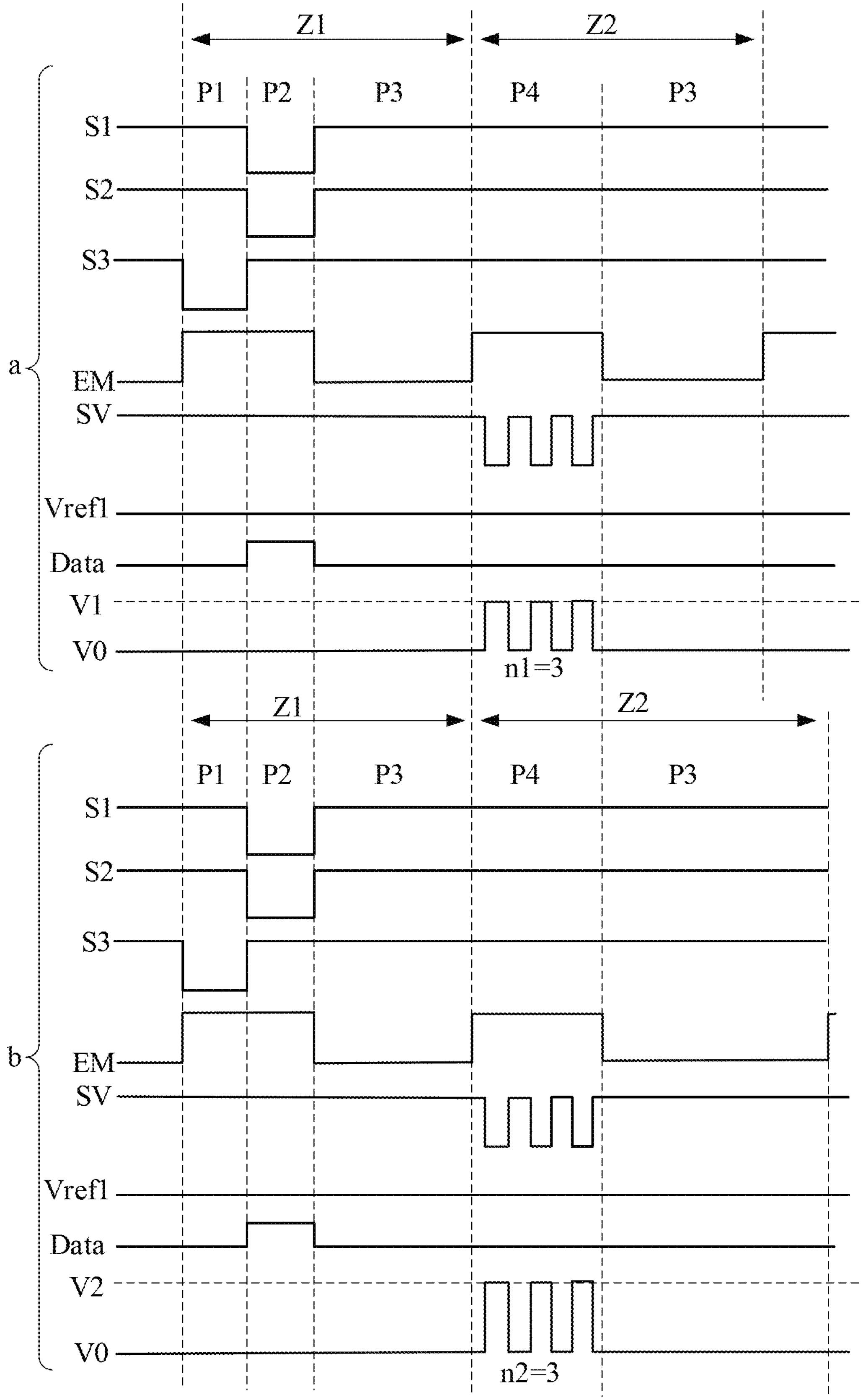
FIG. 6 is a timing diagram of a drive signal of a pixel circuit according to an embodiment of the present disclosure.

For example, the first bias adjustment signal and the second bias adjustment signal are loaded in the retention frame, f1>f2, and the pixel circuit has the structure as shown in FIG. 2. FIG. 6 is a timing diagram of a drive signal of a pixel circuit according to an embodiment of the present disclosure, where a corresponds to the first pixel circuit, and b corresponds to the second pixel circuit. Referring to FIG. 6, a frame of display image includes a refresh frame Z1 and a retention frame Z2. Since f1>f2, optionally, a retention frame in the second display region has a longer duration than the duration of a retention frame in the first display region. The refresh frame Z1 includes an initialization stage P1, a data write stage P2, and a light emission stage P3. In the initialization stage P1, the third scan signal S3 controls the initialization transistor T5 to be turned on such that the initialization signal Vref1 is written to the gate (a node N2) of the drive transistor T3. In the data write stage P2, the first scan signal S1 controls the data write transistor T2 to be turned on, and the second scan signal S2 controls the compensation transistor T4 to be turned on such that the data signal Data is written to the gate of the drive transistor T3, so as to implement data writing and threshold compensation. In the light emission stage P3, the light emission control signal EM controls the first light emission control transistor T1 and the second light emission control transistor T6 to be turned on such that the light-emitting element 20 emits light. The retention frame Z2 includes at least one bias adjustment stage P4 and one light emission stage P3 (for example, only one bias adjustment stage P4 and one light emission stage P3 are included as shown in FIG. 6). In the bias adjustment stage P4, the bias adjustment control signal SV controls the bias adjustment transistor T8 to be turned on such that the bias adjustment signal V0 is loaded to the first electrode (a node N3) of the drive transistor. In this embodiment, f1>f2, the number of times the first bias adjustment signal is loaded is the same as the number of times the second bias adjustment signal is loaded (for example, n1=n2=3), and the first bias adjustment signal and the second bias adjustment signal have the different voltages (V1<V2).

In another embodiment, the voltage value of the first bias adjustment signal may also be configured to be the same as the voltage value of the second bias adjustment signal, and the numbers of times the bias adjustment signals are loaded in the same refresh frame or in the same retention frame may be configured to be different. Optionally, a frame of display image includes a refresh frame and a retention frame; in the first display region, the number of times the first bias adjustment signal is loaded in the same refresh frame or in the same retention frame is n1, and the voltage value of the first bias adjustment signal is V1; and in the second display region, the number of times the second bias adjustment signal is loaded in the same refresh frame or in the same retention frame is n2, and the voltage value of the second bias adjustment signal is V2; where n1≠n2, and V1=V2.

It is to be understood that when the refresh rate f1 of the first display region is different from the refresh rate f2 of the second display region, the drive transistor in the first pixel circuit and the drive transistor in the second pixel circuit have the different working states. In this embodiment, the voltage value of the first bias adjustment signal may be configured to be the same as the voltage value of the second bias adjustment signal, and the number of times the first bias adjustment signal is loaded in the same refresh frame or in the same retention frame may be configured to be different from the number of times the second bias adjustment signal is loaded in the same refresh frame or in the same retention frame, that is, V1=V2, and n1≠n2, which can also effectively improve the uniformity of the first display region and the second display region and improve the display effect.

In the specific implementation, optionally, f1>f2, and n1<n2; or f1<f2, and n1>n2. It is to be understood that when the refresh rate is relatively low, a frame of display image is retained for a relatively long time. The applicant has found that in order to retain the stable state of the drive transistor, in the case where the voltage value of the bias adjustment signal is constant, the number of times the bias adjustment signal is loaded is increased, which is conducive to increasing an average voltage of the bias adjustment signal and can be equivalent to the increase of a bias voltage, thereby improving the performance of the drive transistor. That is, when f1>f2, n1<n2; or when f1<f2, n1>n2. For example, when f1=30 Hz, f2=60 Hz, and f1<f2, the number of times the first bias adjustment signal is loaded is configured to be greater than the number of times the second bias adjustment signal is loaded. When f1=60 Hz, f2=30 Hz, and f1>f2, the number of times the first bias adjustment signal is loaded is configured to be less than the number of times the second bias adjustment signal is loaded. In the specific implementation, the specific number of times the bias adjustment signal is loaded may be designed according to the actual situations such as the size of the display region, the refresh rate of the display region, and the brightness of the light-emitting element, which is not limited in the embodiment of the present disclosure.

Figure 7:
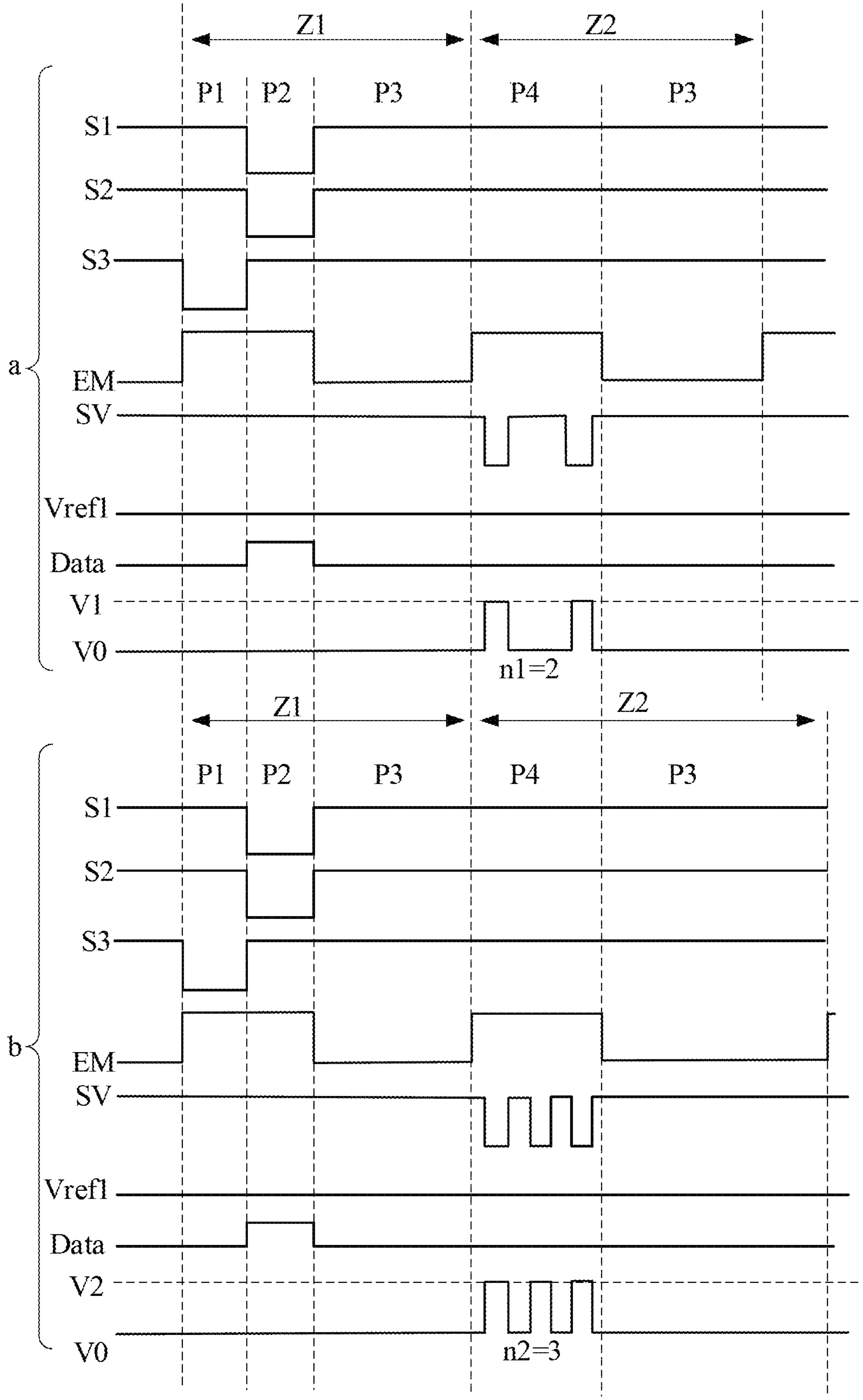
FIG. 7 is a timing diagram of a drive signal of a pixel circuit according to an embodiment of the present disclosure.

For example, the first bias adjustment signal and the second bias adjustment signal are loaded in the retention frame, f1>f2, and the pixel circuit has the structure as shown in FIG. 2. FIG. 7 is a timing diagram of a drive signal of another pixel circuit according to an embodiment of the present disclosure, where a corresponds to the first pixel circuit, and b corresponds to the second pixel circuit. Referring to FIG. 7, FIG. 7 differs from FIG. 6 in that V1=V2 and n1<n2 (for example, n1=2 and n2=3) in this embodiment, which can also have a similar technical effect. A working process of the pixel circuit in this embodiment is similar to that in FIG. 6, and the details are not described here.

As can be seen from the pixel circuits in FIGS. 2 to 5, in addition to the bias state of the drive transistor T3, the reset signal Vref2 provided by the reset module 16 for the light-emitting element 20 also affects the light emission of the light-emitting element. In another embodiment, optionally, the pixel circuit receives a reset signal including a first reset signal and a second reset signal, where the first pixel circuit receives the first reset signal, and the second pixel circuit receives the second reset signal; and the display panel includes multiple light-emitting elements including a first light-emitting element and a second light-emitting element, where the first light-emitting element is disposed in the first display region, the second light-emitting element is disposed in the second display region, the first light-emitting element is connected to a first node of the first pixel circuit, the first node is provided with the first reset signal, the second light-emitting element is connected to a second node of the second pixel circuit, and the second node is provided with the second reset signal; where the first reset signal is different from the second reset signal.

It is to be understood that in this embodiment, the first node is the anode of the light-emitting element in the first display region, and the second node is the anode of the light-emitting element in the second display region. The reset signals of the anodes of the light-emitting elements are adjusted so that light-emitting states of the light-emitting elements in the display regions with the different refresh rates can be adjusted, thereby improving the display effect. In the specific implementation, the first reset signal and the second reset signal may be provided by the same bus in the time-division manner or may be respectively provided by corresponding buses independently.

According to the technical solution of the embodiment of the present disclosure, the anode voltages of the light-emitting elements are adjusted by the reset signals. When the refresh rates of the first display region and the second display region are different in order to implement the different display functions, the light-emitting elements have the different light emission durations. The reset signals of the different display regions are adjusted, which is conducive to avoiding the display non-uniformity in the different display regions and improving the display effect.

Optionally, a frame of display image includes a refresh frame and a retention frame; in the first display region, the number of times the first reset signal is loaded in the same refresh frame or in the same retention frame is n3, and a voltage value of the first reset signal is V3; and in the second display region, the number of times the second reset signal is loaded in the same refresh frame or in the same retention frame is n4, and a voltage value of the second reset signal is V4; where n3=n4, and V3≠V4.

It is to be understood that when the refresh rate f1 of the first display region is different from the refresh rate f2 of the second display region, the first light-emitting element and the second light-emitting element have the different light-emitting states (for example, the different light emission durations). In this embodiment, the number of times the first reset signal is loaded in the same refresh frame or in the same retention frame may be configured to be the same as the number of times the second reset signal is loaded in the same refresh frame or in the same retention frame, and the voltage value of the first reset signal may be configured to be different from the voltage value of the second reset signal, that is, n3=n4, and V 3≠V4, which is conducive to improving the uniformity of the first display region and the second display region and improving the display effect.

In the specific implementation, optionally, f1>f2, and V3>V4; or f1<f2, and V3<V4. It is to be understood that when the refresh rate is relatively low, a frame of display image is retained for a relatively long time, that is, the light-emitting element has a relatively long light emission duration. The applicant has found that a relatively low reset voltage is adopted, which is conducive to causing the light-emitting element to better restore an initial state after emitting light for a longtime, thereby avoiding affecting the subsequent accurate control of the brightness. That is, when f1>f2, V3>V4; or when f1<f2, V3<V4. For example, when f1=60 Hz, f2=30 Hz, and f1>f2, the voltage value of the first reset signal is configured to be greater than the voltage value of the second reset signal. When f1=30 Hz, f2=60 Hz, and f1<f2, the voltage value of the first reset signal is configured to be less than the voltage value of the second reset signal. In the specific implementation, a specific voltage value of the reset signal may be designed according to the actual situations such as the size of the display region, the refresh rate of the display region, and the brightness of the light-emitting element, which is not limited in the embodiment of the present disclosure.

Figure 8:
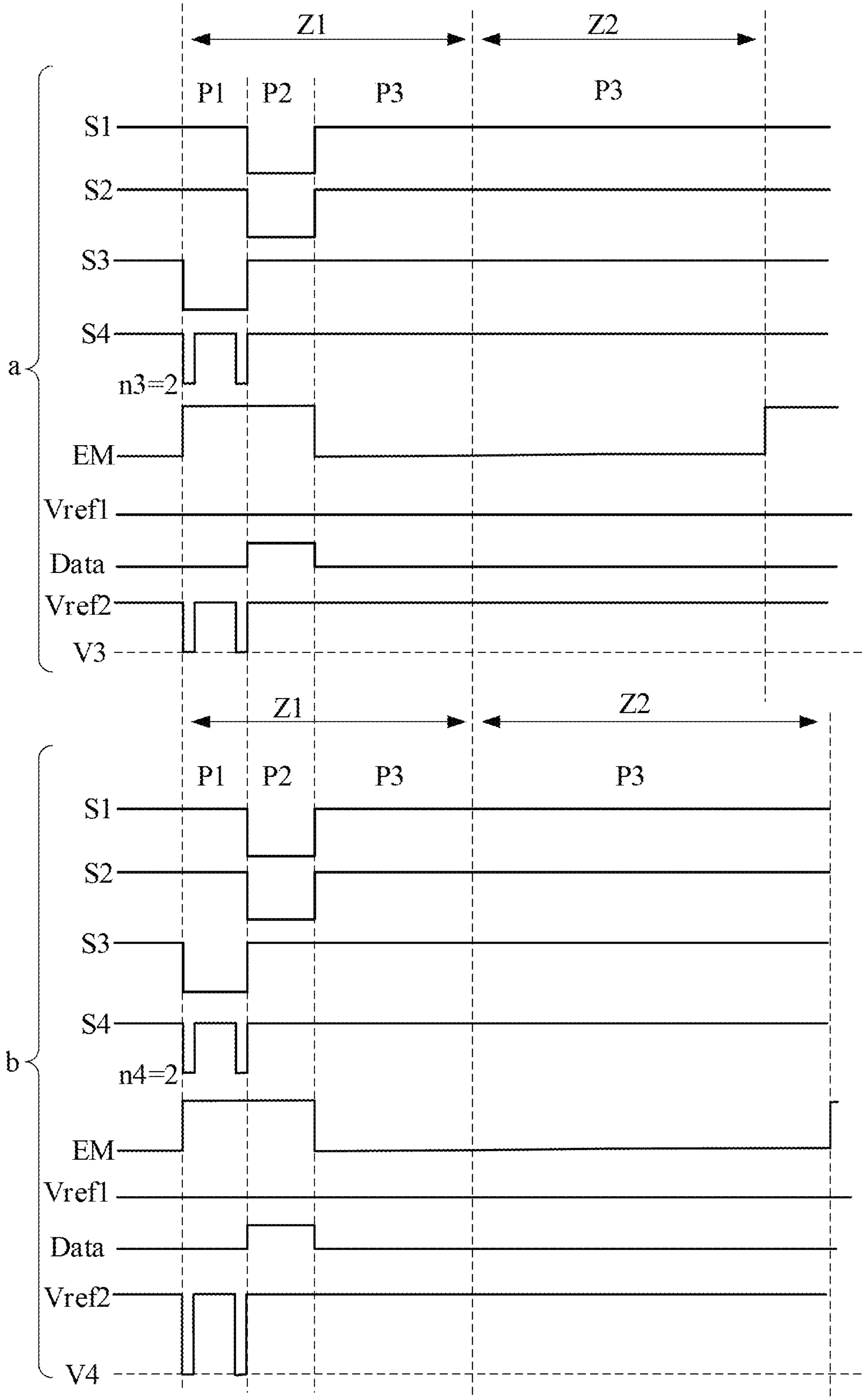
FIG. 8 is a timing diagram of a drive signal of a pixel circuit according to an embodiment of the present disclosure.

For example, the first reset signal and the second reset signal are loaded in the refresh frame, f1>f2, and the pixel circuit has the structure as shown in FIG. 2. FIG. 8 is a timing diagram of a drive signal of another pixel circuit according to an embodiment of the present disclosure, where a corresponds to the first pixel circuit, and b corresponds to the second pixel circuit. Referring to FIG. 8, in the initialization stage P1, the fourth scan signal S4 controls the reset transistor T7 to be turned on, and the anode (a node N1) of the light-emitting element 20 is provided with the reset signal Vref2. In this embodiment, it is configured that f1>f2, the number of times the first reset signal is loaded is configured to be the same as the number of times the second reset signal is loaded (for example, n3=n4=2), and the voltage value of the first reset signal is configured to be different from the voltage value of the second reset signal (V3>V4).

In another embodiment, the voltage value of the first reset signal may also be configured to be the same as the voltage value of the second reset signal, and the numbers of times the reset signals are loaded in a frame of display image may be configured to be different. Optionally, a frame of display image includes a refresh frame and a retention frame; in the first display region, the number of times the first reset signal is loaded in the same refresh frame or in the same retention frame is n3, and the voltage value of the first reset signal is V3; and in the second display region, the number of times the second reset signal is loaded in the same refresh frame or in the same retention frame is n4, and the voltage value of the second reset signal is V4; where n3≠n4, and V3=V4.

It is to be understood that when the refresh rate f1 of the first display region is different from the refresh rate f2 of the second display region, the first light-emitting element and the second light-emitting element have the different light-emitting states (for example, the different light emission durations). In this embodiment, the voltage value of the first reset signal may be configured to be the same as the voltage value of the second reset signal, and the number of times the first reset signal is loaded in the same refresh frame or in the same retention frame may be configured to be different from the number of times the second reset signal is loaded in the same refresh frame or in the same retention frame, that is, V3=V4, and n3≠n4, which can also effectively improve the uniformity of the first display region and the second display region and improve the display effect.

In the specific implementation, optionally, $f1 > f2$, and $n3 < n4$; or $f1 < f2$, and $n3 > n4$. It is to be understood that when the refresh rate is relatively low, a frame of display image is retained for a relatively long time, that is, the light-emitting element has a relatively long light emission duration. The applicant has found that in order to cause the light-emitting element to better restore the initial state and prevent the performance of the light-emitting element from being affected by relatively long-time light emission, the number of times the reset signal is loaded is increased, which is conducive to causing the light-emitting element to better restore the initial state, thereby avoiding affecting the subsequent accurate control of the brightness.

That is, when $f1 > f2$, $n3 < n4$; or when $f1 < f2$, $n3 > n4$. For example, when $f1 = 60$ Hz, $f2 = 30$ Hz, and $f1 > f2$, the number of times the first reset signal is loaded is configured to be less than the number of times the second reset signal is loaded. When $f1 = 30$ Hz, $f2 = 60$ Hz, and $f1 < f2$, the number of times the first reset signal is loaded is configured to be greater than the number of times the second reset signal is loaded. In the specific implementation, the specific number of times the reset signal is loaded may be designed according to the actual situations such as the size of the display region, the refresh rate of the display region, and the brightness of the light-emitting element, which is not limited in the embodiment of the present disclosure.

Figure 9:
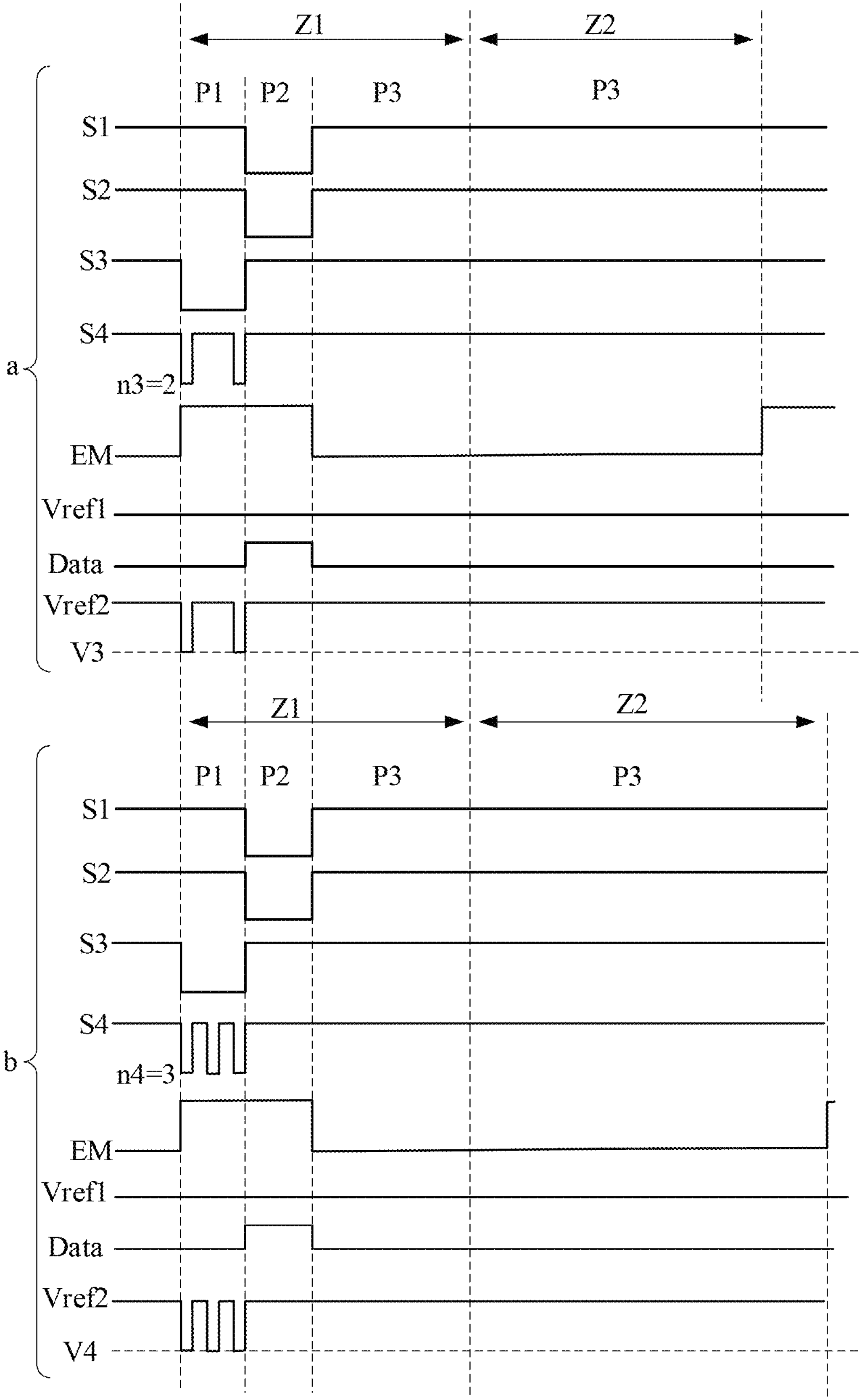
FIG. 9 is a timing diagram of a drive signal of a pixel circuit according to an embodiment of the present disclosure.

For example, similar to the preceding embodiment, FIG. 9 is a timing diagram of a drive signal of another pixel circuit according to an embodiment of the present disclosure, where a corresponds to the first pixel circuit and b corresponds to the second pixel circuit. Referring to FIG. 9, in this embodiment, it is configured that $f1 > f2$, the number of times the first reset signal is loaded is configured to be different from the number of times the second reset signal is loaded (for example, $n3 = 2$, and $n4 = 3$), and the voltage value of the first reset signal is configured to be the same as the voltage value of the second reset signal ($V3 = V4$).

It is to be noted that a loading mode of the reset signal is not shown in the embodiments shown in FIG. 6 and FIG. 7, and a loading mode of the bias adjustment signal is not shown in the embodiments shown in FIG. 8 and FIG. 9. In the specific implementation, the two loading modes may be configured in combination and selected according to the actual situation.

In a certain embodiment, optionally, the display panel further includes a bias adjustment signal output terminal for providing the bias adjustment signal.

Figure 10:
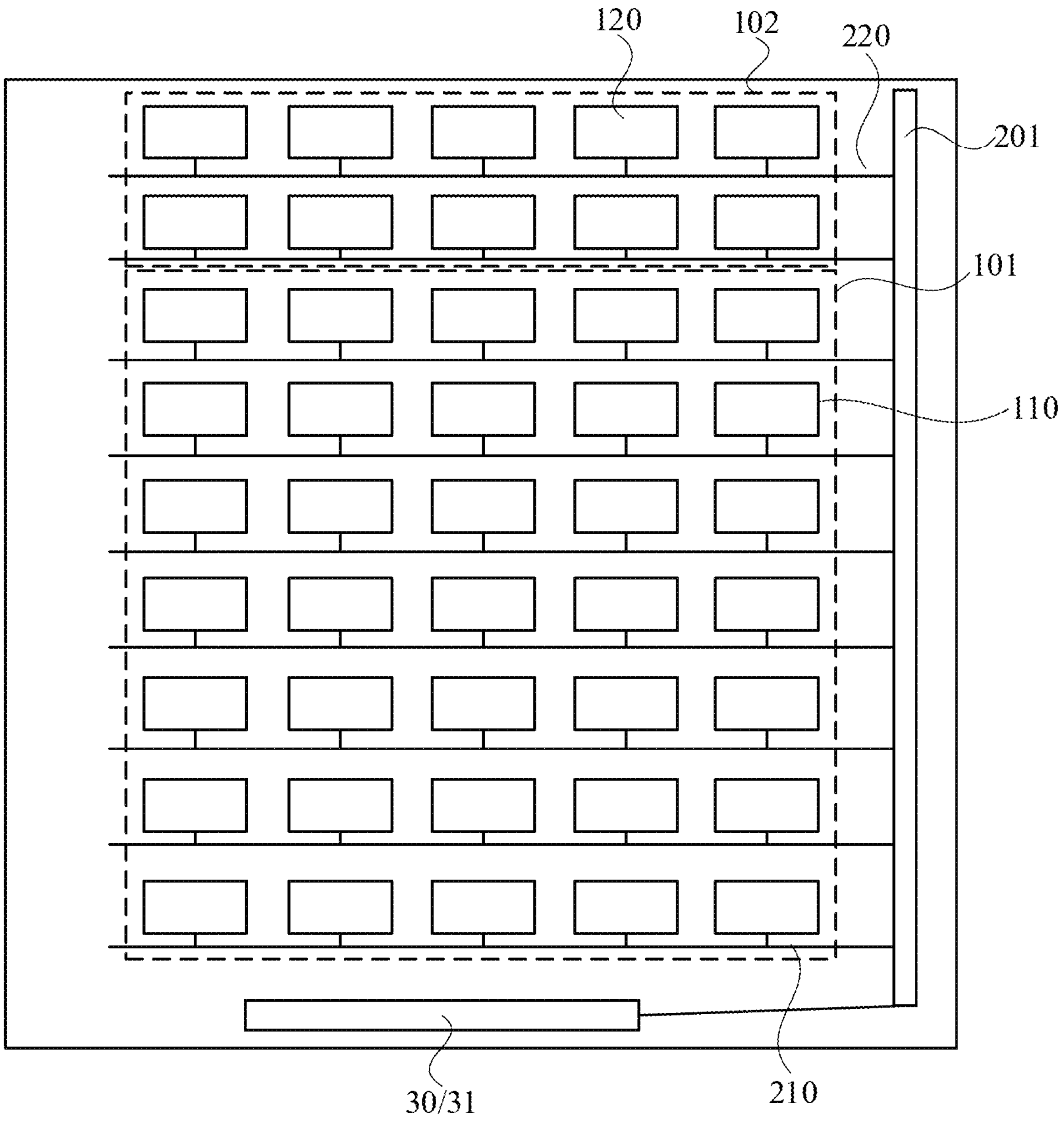
FIG. 10 is a structure diagram of another display panel according to an embodiment of the present disclosure.

In the specific implementation, the bias adjustment signal output terminal may be disposed in a non-display region of the display panel. For example, FIG. 10 is a structure diagram of another display panel according to an embodiment of the present disclosure. Optionally, the display panel further includes a bias adjustment signal output terminal 30. The bias adjustment signal output terminal 30 includes a first bias adjustment signal output terminal 31 for providing the first bias adjustment signal for the first pixel circuit 110 during a first period and providing the second bias adjustment signal for the second pixel circuit 120 during a second period.

Since the bias adjustment signal is not continuously loaded into the pixel circuit, corresponding bias adjustment signals may be provided for the first display region 101 and the second display region 102 in a time-division multiplexing manner, respectively. In the specific implementation, a bias adjustment signal out terminal 30 may be built into a driver chip, which is not limited in the embodiment of the present disclosure. In other embodiments, voltage amplitudes and loading frequencies of the first bias adjustment signal and the second bias adjustment signal may be the same or different, and the design may be made according to the actual situation in the specific implementation.

Optionally, with continued reference to FIG. 10, the display panel further includes a first signal bus 201, where the first pixel circuit 110 is electrically connected to a first bias adjustment signal output terminal 31 through the first signal bus 201, and the second pixel circuit 120 is electrically connected to the first bias adjustment signal output terminal 31 through the first signal bus 201. Specifically, the first signal bus 201 is connected to the first pixel circuit 110 through the first bias adjustment signal line 210, and the first signal bus 201 is connected to the second pixel circuit 120 through the second bias adjustment signal line 220. The first signal bus 201 may be disposed in a bezel region of the display panel. The first signal bus 201 shown in FIG. 10 is disposed in only one bezel region of the display panel, which is only exemplary and does not limit the embodiment of the present disclosure.

Figure 11:
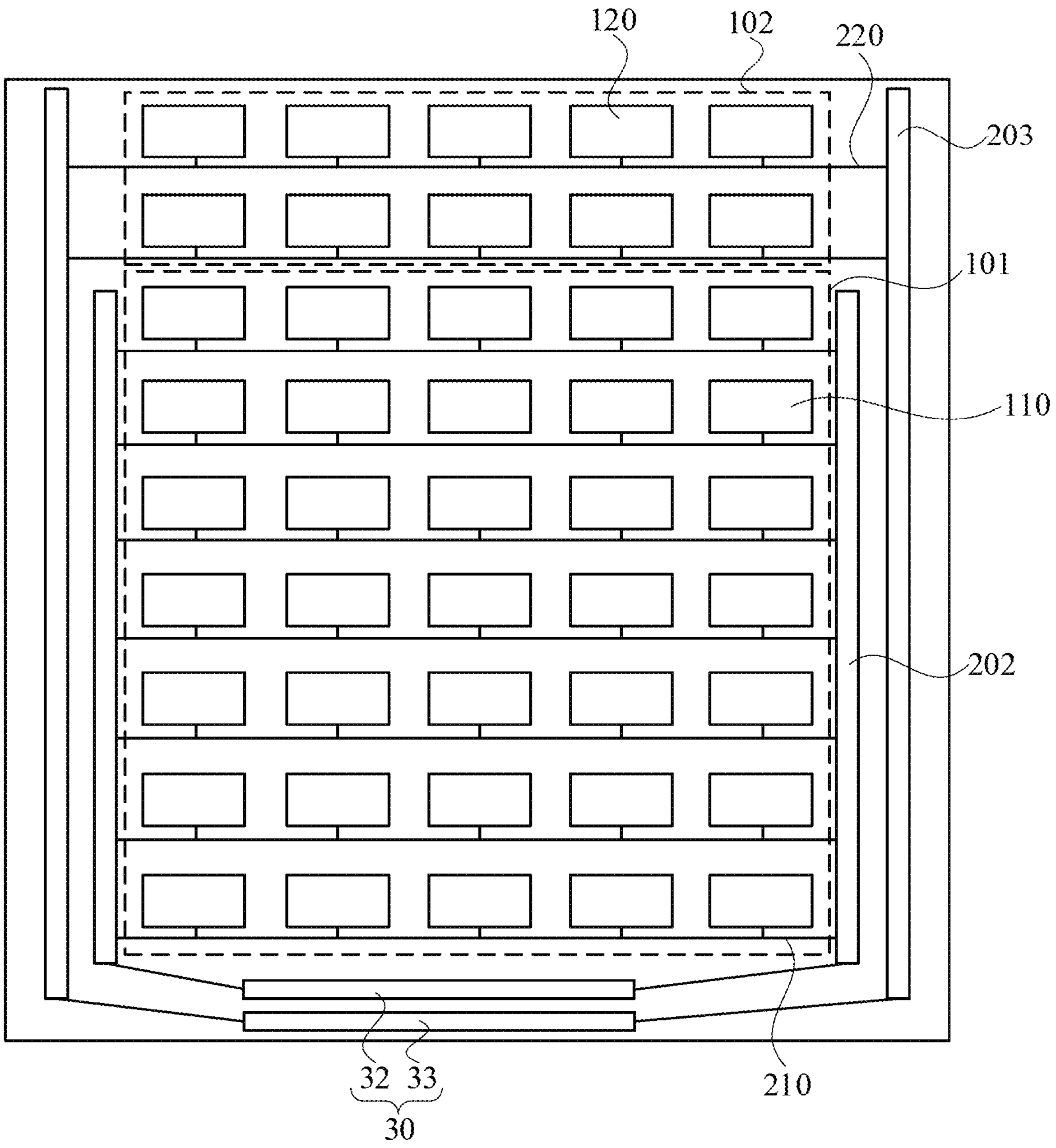
FIG. 11 is a structure diagram of another display panel according to an embodiment of the present disclosure.

FIG. 11 is a structure diagram of another display panel according to an embodiment of the present disclosure. Referring to FIG. 11, optionally, the bias adjustment signal output terminal 30 includes a second bias adjustment signal output terminal 32 and a third bias adjustment signal output terminal 33, where the second bias adjustment signal output terminal 32 is configured to provide the first bias adjustment signal for the first pixel circuit 110, and the third bias adjustment signal output terminal 33 is configured to provide the second bias adjustment signal for the second pixel circuit 120.

The first pixel circuit 110 and the second pixel circuit 120 are each provided with the independent bias adjustment signal output terminal separately such that when the second bias adjustment signal output terminal 32 provides the first bias adjustment signal for the first pixel circuit 110, the third bias adjustment signal output terminal 33 may also provide the second bias adjustment signal for the second pixel circuit 120 simultaneously, which is conducive to simplifying a drive timing.

Optionally, with continued reference to FIG. 11, the display panel further includes the second signal bus 202 and the third signal bus 203, where the first pixel circuit 110 is electrically connected to a second bias adjustment signal output terminal 32 through the second signal bus 202, and the second pixel circuit 120 is electrically connected to a third bias adjustment signal output terminal 33 through the third signal bus 203.

Specifically, the second signal bus 202 is connected to the first pixel circuit 110 through the first bias adjustment signal line 210, and the third signal bus 203 is connected to the second pixel circuit 120 through the second bias adjustment signal line 220. The second signal bus 202 and the third signal bus 203 may be disposed in a bezel region of the display panel. The second signal bus 202 and the third signal bus 203 shown in FIG. 11 are respectively disposed in the left and right bezels, which is only exemplary and does not limit the embodiment of the present disclosure.

It is to be noted that the display panel further includes a reset signal terminal, and a specific configuration manner of the reset signal terminal may be similar to the configuration manner of the bias adjustment signal terminal, and the details are not described here.

Optionally, the display panel includes m1 display regions with different refresh rates in a first working mode, where m1 is an integer greater than or equal to 3. The display panel includes m1 bias adjustment signal output terminals, where different bias adjustment signal output terminals provide different bias adjustment signals for pixel circuits in respective display regions.

Figure 12:
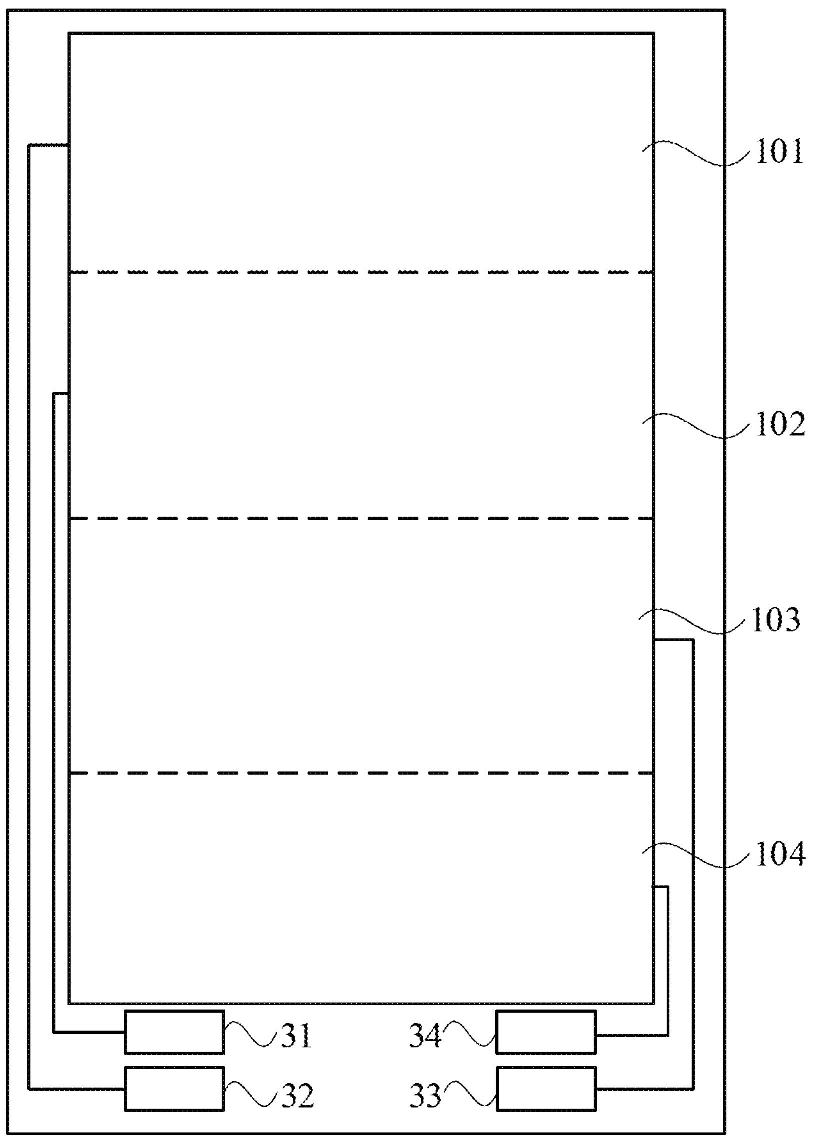
FIG. 12 is a structure diagram of another display panel according to an embodiment of the present disclosure.

For example, FIG. 12 is a structure diagram of another display panel according to an embodiment of the present disclosure. Referring to FIG. 12, optionally, the display panel includes four display regions 101, 102, 103, and 104, and four bias adjustment signal output terminals 31, 32, 33, and 34. Each bias adjustment signal output terminal is connected to a pixel circuit (not shown in FIG. 12) in a respective display region. In the first working mode, the display regions 101, 102, 103, and 104 have different refresh rates, and the bias adjustment signal output terminals 31, 32, 33, and 34 may provide different bias adjustment signals for the corresponding pixel circuits, respectively. In another working mode, the display regions 101, 102, 103, and 104 may have the same refresh rate, and the bias adjustment signal output terminals 31, 32, 33, and 34 may provide the same bias adjustment signal to the corresponding pixel circuits, respectively. In more working modes, at least two display regions may have the same refresh rate, which is not limited in the embodiment of the present disclosure.

It is to be noted that in other embodiments, at least two different display regions may also be configured to have the same refresh rate, and when the two display regions have the same refresh rate, the pixel circuits in the two display regions may receive the same bias adjustment signal and/or the same reset signal. In the specific implementation, optionally, the display panel includes m1 display regions, where m1 is an integer greater than or equal to 3, and at least two display regions have the same refresh rate in a second working mode. Optionally, the display panel includes m2 bias adjustment signal output terminals, where m2<m1, and at least one bias adjustment signal output terminal provides the same bias adjustment signal for pixel circuits in the at least two display regions with the same refresh rate.

Figure 13:
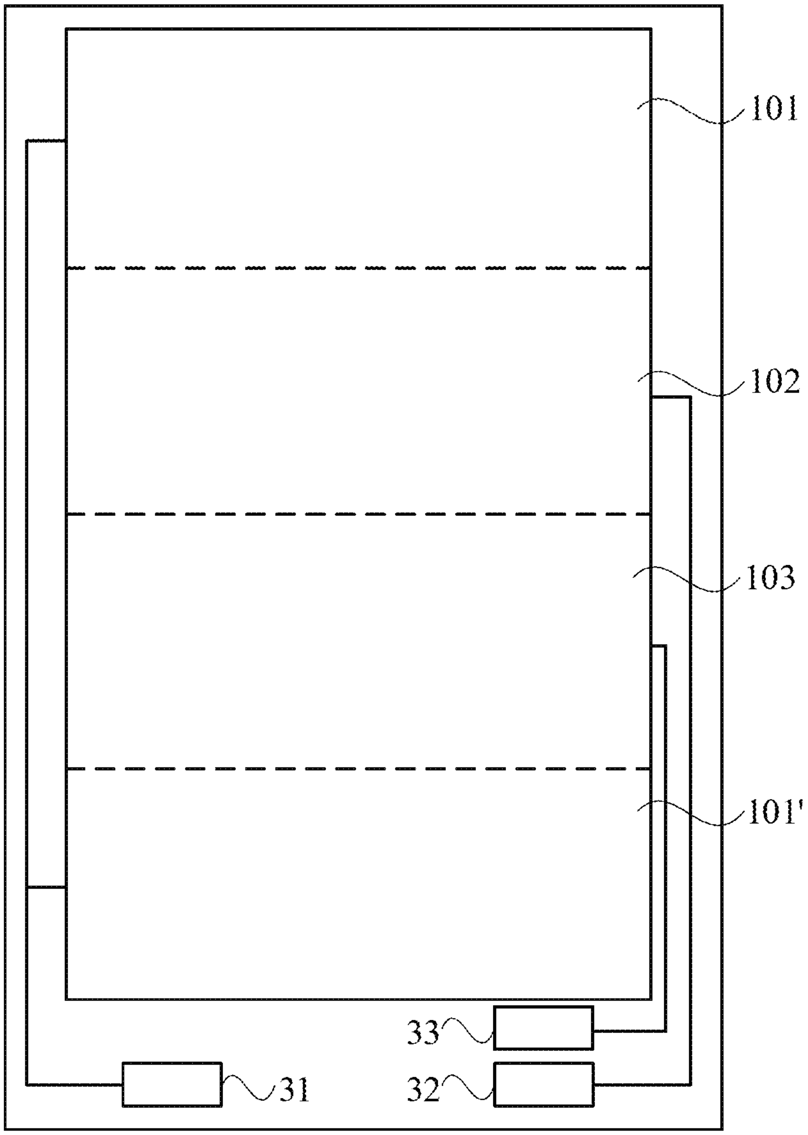
FIG. 13 is a structure diagram of another display panel according to an embodiment of the present disclosure.

For example, the display panel includes four display regions. For example, FIG. 13 is a structure diagram of another display panel according to an embodiment of the present disclosure. Referring to FIG. 13, the display panel includes four display regions 101, 102, 103, and 101', where display regions 101 and 101' have the same refresh rate in a certain working mode, and the display panel further includes three bias adjustment signal output terminals 31, 32, and 33, where a bias adjustment signal output terminal 31 simultaneously provides the bias adjustment signal for the display regions 101 and 101'. Further, the pixel circuits in the at least two display regions with the same refresh rate receive the same reset signal, which is conducive to the reduction in the number of bias adjustment signal terminals and the simplification of the structure of the display panel.

Optionally, the display panel further includes multiple scan signal lines extending in a first direction and multiple data signal lines extending in a second direction, where the first direction and the second direction intersect with each other; the at least two display regions with the different refresh rates are arranged in the first direction; or the at least two display regions with the different refresh rates are arranged in the second direction.

Figure 14:
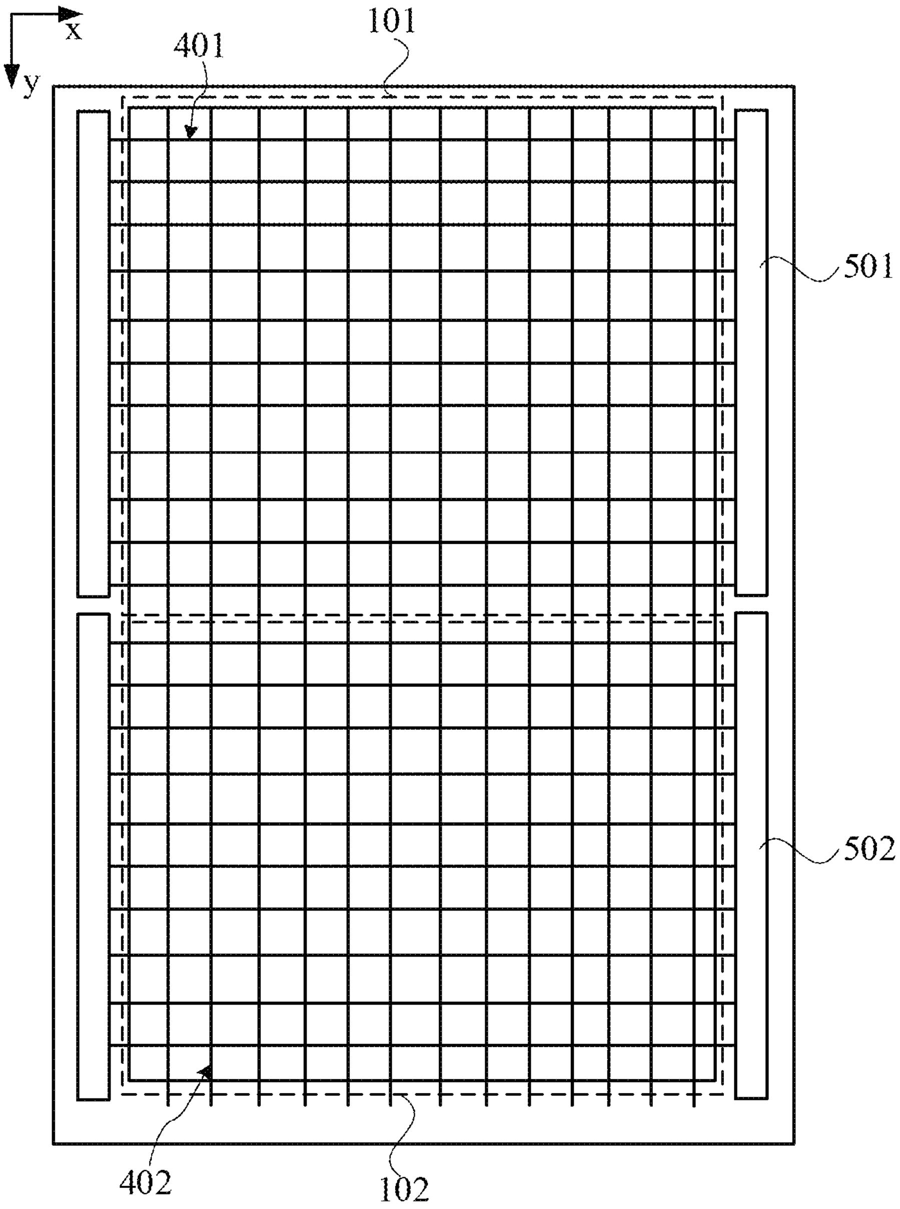
FIG. 14 is a structure diagram of another display panel according to an embodiment of the present disclosure.

For example, two display regions are used as an example, and FIG. 14 is a structure diagram of another display panel according to an embodiment of the present disclosure. Referring to FIG. 14, the display panel includes multiple scan signal lines 401 extending in a first direction x and multiple data signal lines 402 extending in a second direction y, and the first display region 101 and the second display region 102 are arranged in the second direction y.

It is to be understood that the display panel further includes a first scan circuit 501 corresponding to the first display region 101 and a second scan circuit 502 corresponding to the second display region 102, where the first scan circuit 501 may include multiple cascaded first shift registers, the second scan circuit 502 may include multiple cascaded second shift registers, and the first scan circuit 501 and the second scan circuit 502 have different scan frequencies so that the first display region 101 and the second display region 102 have different refresh rates.

Figure 15:
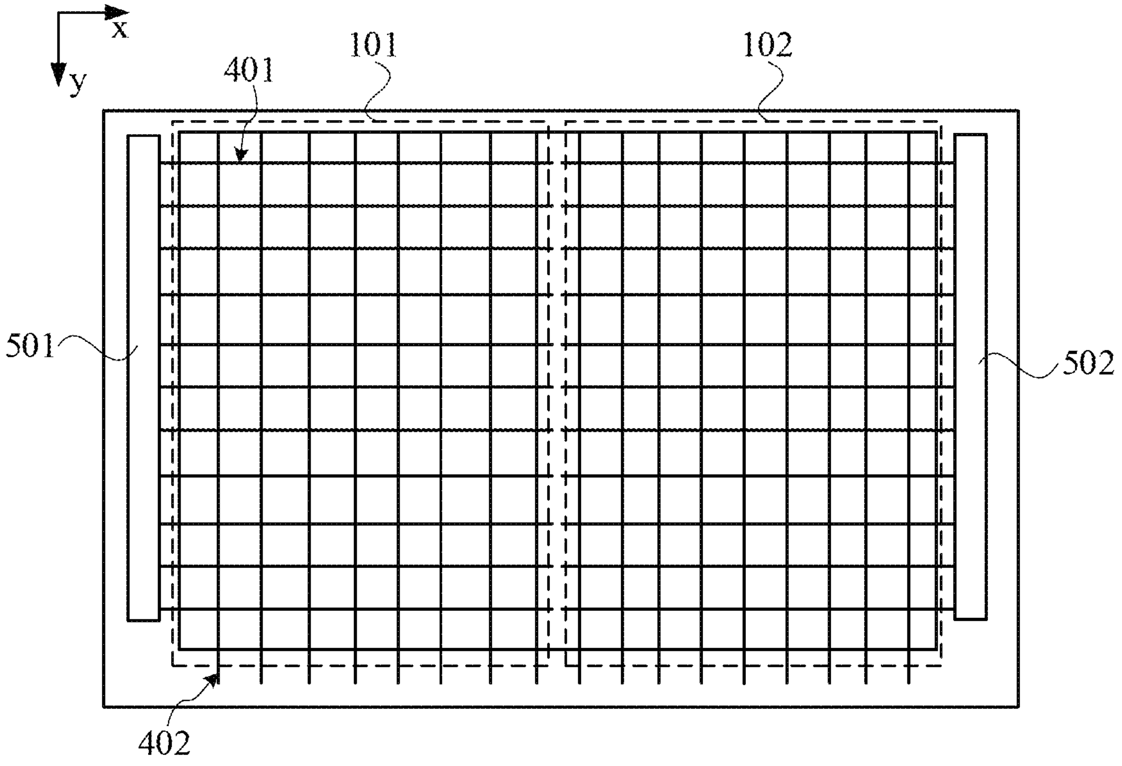
FIG. 15 is a structure diagram of another display panel according to an embodiment of the present disclosure.

In FIG. 14 and in the preceding embodiments, display regions with different resolutions are each arranged in a vertical direction (the extension direction of the data signal line). In another embodiment, for example, in an application such as a foldable screen, display regions with different resolutions may be arranged in a lateral direction (the extension direction of a scan signal line). For example, FIG. 15 is a structure diagram of another display panel according to an embodiment of the present disclosure. Referring to FIG. 15, the display panel includes multiple scan signal lines 401 extending in the first direction x and multiple data signal lines 402 extending in the second direction y, and the first display region 101 and the second display region 102 are arranged in the second direction y.

It is to be understood that the display panel further includes the first scan circuit 501 corresponding to the first display region 101 and the second scan circuit 502 corresponding to the second display region 102, where the first scan circuit 501 may include the multiple cascaded first shift registers, the second scan circuit 502 may include the multiple cascaded second shift registers, and the first scan circuit 501 and the second scan circuit 502 have the different scan frequencies so that the first display region 101 and the second display region 102 have the different refresh rates.

The embodiments of the present disclosure further provide a display panel including at least two display regions and a pixel circuit. The at least two display regions include a first display region and a second display region. The pixel circuit includes at least a first pixel circuit and a second pixel circuit, where the first pixel circuit is disposed in the first display region and the second pixel circuit is disposed in the second display region. The pixel circuit receives a reset signal including a first reset signal and a second reset signal, where when a refresh rate of the first display region is f1, the first pixel circuit receives the first reset signal, and when a refresh rate of the second display region is f2, the second pixel circuit receives the second reset signal. The display panel includes multiple light-emitting elements including a first light-emitting element and a second light-emitting element, where the first light-emitting element is disposed in the first display region, the second light-emitting element is disposed in the second display region, the first light-emitting element is connected to a first node of the first pixel circuit, the first node is provided with the first reset signal, the second light-emitting element is connected to a second node of the second pixel circuit, and the second node is provided with the second reset signal, where $f1 \neq f2$, and the first reset signal is different from the second reset signal.

According to the technical solution of the embodiment of the present disclosure, the anode voltage of the light-emitting element is adjusted by the reset signal. When the refresh rates of the first display region and the second display region are different in order to implement the different display functions, the light-emitting elements have the different light emission durations. The reset signals of the different display regions are adjusted, which is conducive to avoiding the display non-uniformity in the different display regions and improving the display effect.

Optionally, a frame of display image includes a refresh frame and a retention frame; in the first display region, the number of times the first reset signal is loaded in the same refresh frame or in the same retention frame is n3, and a voltage value of the first reset signal is V3; and in the second display region, the number of times the second reset signal is loaded in the same refresh frame or in the same retention frame is n4, and a voltage value of the second reset signal is V4; where n3=n4, and V3≠V4.

Optionally, f1>f2, and V3>V4; or f1<f2, and V3<V4.

Optionally, a frame of display image includes a refresh frame and a retention frame; in the first display region, the number of times the first reset signal is loaded in the same refresh frame or in the same retention frame is n3, and a voltage value of the first reset signal is V3; and in the second display region, the number of times the second reset signal is loaded in the same refresh frame or in the same retention frame is n4, and a voltage value of the second reset signal is V4; where n3≠n4, and V3=V4.

Optionally, f1>f2, and n3<n4; or f1<f2, and n3>n4.

It is to be understood that the technical solution that the reset signals are configured to be different in this embodiment is similar to the technical solution in the preceding embodiment, and the details are not described here. This embodiment differs from the preceding embodiment in that the bias adjustment signal is not provided. In the specific implementation, different bias adjustment signals may also be applied to pixel circuits in different display regions, and the implementation manner thereof is similar to that of the preceding embodiment.

Figure 16:
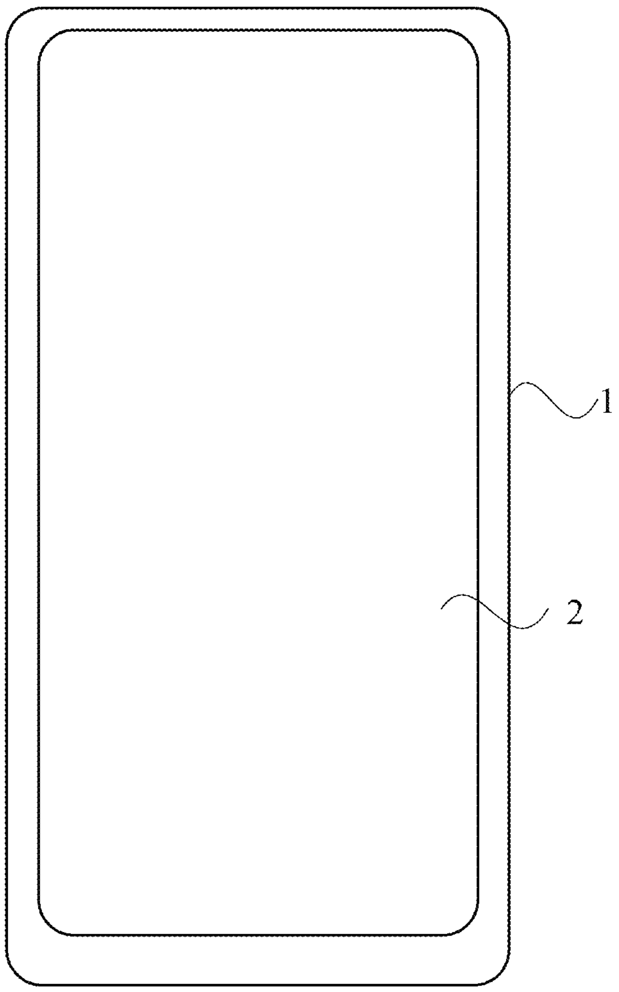
FIG. 16 is a structure diagram of a display device according to an embodiment of the present disclosure.

FIG. 16 is a structure diagram of a display device according to an embodiment of the present disclosure. Referring to FIG. 16, the display device 1 includes any one of the display panels 2 provided in the embodiments of the present disclosure. Specifically, the display device 1 may be a mobile phone, a computer, an intelligent wearable device, or the like.

Since the display device provided by this embodiment includes any display panel provided by the preceding embodiments, the display device has technical effects which are the same as or correspond to the technical effects of the display panel, and the details are not described here.

It is to be noted that the preceding are only preferred embodiments of the present disclosure and the technical principles used therein. It is to be understood by those skilled in the art that the present disclosure is not limited to the embodiments described herein. For those skilled in the art, various apparent modifications, adaptations, combinations, and substitutions can be made without departing from the scope of the present disclosure. Therefore, while the present disclosure is described in detail through the preceding embodiments, the present disclosure is not limited to the preceding embodiments and may include more equivalent embodiments without departing from the concept of the present disclosure. The scope of the present disclosure is determined by the scope of the appended claims.

What is claimed is:

1. A display panel, comprising:

at least two display regions, wherein the at least two display regions comprise a first display region and a second display region; and a pixel circuit, wherein the pixel circuit comprises at least a first pixel circuit and a second pixel circuit, the first pixel circuit is disposed in the first display region, and the second pixel circuit is disposed in the second display region;

wherein the pixel circuit receives a bias adjustment signal, the bias adjustment signal comprises a first bias adjustment signal and a second bias adjustment signal, in response to a refresh rate of the first display region being f1, the first pixel circuit receives the first bias adjustment signal, and in response to a refresh rate of the second display region being f2, the second pixel circuit receives the second bias adjustment signal, wherein f1≠f2; and wherein the display panel further comprises a first signal bus, wherein the first signal bus is electrically connected to the first pixel circuit and the second pixel circuit respectively, the first signal bus is configured to provide the first bias adjustment signal to the first pixel circuit in a first period, and to provide the second bias adjustment signal to the second pixel circuit in a second period.

2. The display panel according to claim 1, further comprising a plurality of first bias adjustment signal lines;

at least one of the plurality of first bias adjustment signal lines is connected to the first pixel circuit and the first signal bus respectively;

at least one of the plurality of first bias adjustment signal lines is connected to the second pixel circuit and the first signal bus respectively.

3. The display panel according to claim 2, wherein extension directions of the plurality of first bias adjustment signal lines intersect with an extension direction of the first signal bus.

4. The display panel according to claim 2, wherein an arrangement direction of the first display region and the second display region intersects with extension directions of the plurality of first bias adjustment signal lines.

5. The display panel according to claim 1, wherein the display panel further comprises a bezel region, and the first signal bus is located in the bezel region.

6. The display panel according to claim 1, wherein an arrangement direction of the first display region and the second display region is the same as an extension direction of the first signal bus.

7. The display panel according to claim 1, further comprising a bias adjustment signal output terminal, wherein the bias adjustment signal output terminal is configured to provide the bias adjustment signal;

wherein the bias adjustment signal output terminal comprises a first bias adjustment signal output terminal, and the first bias adjustment signal output terminal is configured to provide the first bias adjustment signal for the first pixel circuit during a first period and provide the second bias adjustment signal for the second pixel circuit during a second period, and the first signal bus is electrically connected to the first bias adjustment output terminal.

8. The display panel according to claim 7, wherein in a first working mode, the display panel comprises m1 display regions with different refresh rates, and m1 is an integer greater than or equal to 3; and the display panel comprises m1 bias adjustment signal output terminals, and different bias adjustment signal output terminals provide different bias adjustment signals for pixel circuits in corresponding display regions.

9. The display panel according to claim 7, wherein the display panel comprises m1 display regions, m1 is an integer greater than or equal to 3, and in a second working mode, at least two display regions among the m1 display regions have a same refresh rate;

the display panel comprises m2 bias adjustment signal output terminals, $m2<m1$, and at least one of the m2 bias adjustment signal output terminals provides a same bias adjustment signal for pixel circuits of the at least two display regions with the same refresh rate.

10. A display panel, comprising:

at least two display regions, wherein the at least two display regions comprise a first display region and a second display region; and a pixel circuit, wherein the pixel circuit comprises at least a first pixel circuit and a second pixel circuit, the first pixel circuit is disposed in the first display region, and the second pixel circuit is disposed in the second display region;

wherein the pixel circuit receives a bias adjustment signal, the bias adjustment signal comprises a first bias adjustment signal and a second bias adjustment signal, in response to a refresh rate of the first display region being f1, the first pixel circuit receives the first bias adjustment signal, and in response to a refresh rate of the second display region being f2, the second pixel circuit receives the second bias adjustment signal, wherein $f1 \neq f2$; and wherein the display panel further comprises a second signal bus and a third signal bus, wherein the second signal bus is electrically connected to the first pixel circuit, the third signal bus is electrically connected to the second pixel circuit, the second signal bus is configured to provide the first bias adjustment signal to the first pixel circuit, and the third signal bus is configured to provide the second bias adjustment signal to the second pixel circuit, wherein the display panel further comprises a bias adjustment signal output terminal, wherein the bias adjustment signal output terminal is configured to provide the bias adjustment signal;

wherein the bias adjustment signal output terminal comprises a second bias adjustment signal output terminal and a third bias adjustment signal output terminal, and the second bias adjustment signal output terminal is configured to provide the first bias adjustment signal for the first pixel circuit and the third bias adjustment signal output terminal is configured to provide the second bias adjustment signal for the second pixel circuit; and the second signal bus is electrically connected to the second bias adjustment output terminal, and the third signal bus is electrically connected to the third bias adjustment output terminal, wherein the display panel comprises m1 display regions, m1 is an integer greater than or equal to 3, and in a second working mode, at least two display regions among the m1 display regions have a same refresh rate;

the display panel comprises m2 bias adjustment signal output terminals, $m2<m1$, and at least one of the m2 bias adjustment signal output terminals provides a same bias adjustment signal for pixel circuits of the at least two display regions with the same refresh rate.

11. The display panel according to claim 10, further comprising a first bias adjustment signal line and a second bias adjustment signal line;

wherein the first bias adjustment signal line is connected to the first pixel circuit and the second signal bus respectively; and the second bias adjustment signal line is connected to the second pixel circuit and the third signal bus respectively.

12. The display panel according to claim 11, wherein the display panel satisfies at least one of: an extension direction of the first bias adjustment signal line intersects with an extension direction of the second signal bus; or an extension direction of the second bias adjustment signal line intersects with an extension direction of the third signal bus.

13. The display panel according to claim 11, wherein the display panel satisfies at least one of: an arrangement direction of the first display region and the second display region intersects with an extension direction of the first bias adjustment signal line; or an arrangement direction of the first display region and the second display region intersects with an extension direction of the second bias adjustment signal line.

14. The display panel according to claim 10, wherein the display panel satisfies at least one of: an arrangement direction of the first display region and the second display region is the same as an extension direction of the second signal bus; or an arrangement direction of the first display region and the second display region is the same as an extension direction of the third signal bus.

15. The display panel according to claim 10, wherein the display panel further comprises a bezel region, and at least one of the second signal bus or the third signal bus is located in the bezel region.

16. The display panel according to claim 15, wherein the display panel comprises a plurality of bezel regions, and the second signal bus and the third signal bus are located in the same bezel region; or the second signal bus and the third signal bus are located in different bezel regions.

17. The display panel according to claim 10, wherein in a first working mode, the display panel comprises m1 display regions with different refresh rates, and m1 is an integer greater than or equal to 3; and the display panel comprises m1 bias adjustment signal output terminals, and different bias adjustment signal output terminals provide different bias adjustment signals for pixel circuits in corresponding display regions.

18. A display device comprising a display panel, wherein the display panel comprises:

at least two display regions, wherein the at least two display regions comprise a first display region and a second display region; and a pixel circuit, wherein the pixel circuit comprises at least a first pixel circuit and a second pixel circuit, the first pixel circuit is disposed in the first display region, and the second pixel circuit is disposed in the second display region;

wherein the pixel circuit receives a bias adjustment signal, the bias adjustment signal comprises a first bias adjustment signal and a second bias adjustment signal, in response to a refresh rate of the first display region being f1, the first pixel circuit receives the first bias adjustment signal, and in response to a refresh rate of the second display region being f2, the second pixel circuit receives the second bias adjustment signal, wherein f1+f2; and wherein the display panel further comprises a first signal bus, wherein the first signal bus is electrically connected to the first pixel circuit and the second pixel circuit respectively, the first signal bus is configured to provide the first bias adjustment signal to the first pixel circuit in a first period, and to provide the second bias adjustment signal to the second pixel circuit in a second period, or wherein the display panel further comprises a second signal bus and a third signal bus, wherein the second signal bus is electrically connected to the first pixel circuit, the third signal bus is electrically connected to the second pixel circuit, the second signal bus is configured to provide the first bias adjustment signal to the first pixel circuit, and the third signal bus is configured to provide the second bias adjustment signal to the second pixel circuit, wherein the display panel further comprises a bias adjustment signal output terminal, wherein the bias adjustment signal output terminal is configured to provide the bias adjustment signal;

wherein the bias adjustment signal output terminal comprises a second bias adjustment signal output terminal and a third bias adjustment signal output terminal, and the second bias adjustment signal output terminal is configured to provide the first bias adjustment signal for the first pixel circuit and the third bias adjustment signal output terminal is configured to provide the second bias adjustment signal for the second pixel circuit; and the second signal bus is electrically connected to the second bias adjustment output terminal, and the third signal bus is electrically connected to the third bias adjustment output terminal, wherein the display panel comprises m1 display regions, m1 is an integer greater than or equal to 3, and in a second working mode, at least two display regions among the m1 display regions have a same refresh rate;

the display panel comprises m2 bias adjustment signal output terminals, m2<m1, and at least one of the m2 bias adjustment signal output terminals provides a same bias adjustment signal for pixel circuits of the at least two display regions with the same refresh rate.

* * * * *